US012705211B2

(12) United States Patent
Chaman et al.

(10) Patent No.: US 12,705,211 B2
(45) Date of Patent: Aug. 11, 2026

(54) MULTI-PROTOCOL LOCK MANAGER FOR DISTRIBUTED LOCK MANAGEMENT

(71) Applicant: NetApp, Inc., Sunnyvale, CA (US)

(72) Inventors: Shyamprasad Chaman, Bangalore (IN); Rasmit Ranjan Swain, Bangalore (IN); Ashwani Raina, Jammu (IN); Ketan Pant, Bangalore (IN); Meharpraveen Maddineni, Bangalore (IN)

(73) Assignee: NetApp, Inc., San Jose, CA (US)

( * ) Notice: Subject to any disclaimer, the term of this patent is extended or adjusted under 35 U.S.C. 154(b) by 574 days.

(21) Appl. No.: 17/301,283

(22) Filed: Mar. 30, 2021

(65) Prior Publication Data

US 2022/0182384 A1 Jun. 9, 2022

(30) Foreign Application Priority Data

Nov. 4, 2020 (IN) ............................ 202041048165

(51) Int. Cl.
*G06F 16/176* (2019.01)

(52) U.S. Cl.
CPC ................................ *G06F 16/1774* (2019.01)

(58) Field of Classification Search
CPC ................................................... G06F 16/1774
See application file for complete search history.

(56) References Cited

U.S. PATENT DOCUMENTS

| | | | | |
|---|---|---|---|---|
| 7,313,557 | B1 * | 12/2007 | Noveck | G06F 16/1774 |
| 2007/0185872 | A1 * | 8/2007 | Ho | G06F 9/526 |
| 2014/0365549 | A1 * | 12/2014 | Jenkins | G06F 9/526 709/201 |
| 2015/0120925 | A1 * | 4/2015 | Das | H04L 67/1097 709/225 |
| 2016/0004718 | A1 * | 1/2016 | Lin | G06F 11/1004 707/690 |
| 2016/0154817 | A1 * | 6/2016 | Mason, Jr. | G06F 16/1827 707/704 |
| 2018/0321998 | A1 * | 11/2018 | Borlick | G06F 11/1471 |

* cited by examiner

*Primary Examiner* — Marc S Somers
(74) *Attorney, Agent, or Firm* — Jaffery Watson Hamilton & DeSanctis LLP

(57) ABSTRACT

Techniques are provided for distributed lock and authorities management. An origin may host a resource, such as a file, that may be accessed by clients through a plurality of caches. The origin may receive a first retrieve request from a first endpoint to obtain a first authority for a resource. The origin may delegate the first authority for the resource to the first endpoint. The origin may delegate the second authority for the resource to the second endpoint in response to determining that the delegated authority information and a set of locks held by the origin do not conflict with a second retrieve request from a second endpoint to obtain a second authority.

20 Claims, 11 Drawing Sheets

900

RESOURCE 912

AUTHORITY 908

Fields 914

| LOWEST BYTE RANGE: 500 | HIGHEST BYTE RANGE: 6000 | CACHE SET: CACHE 902 CACHE 904 |
|---|---|---|

DELEGATED AUTHORITY INFORMATION 910

AUTHORITY INFORMATION 906

ORIGIN VOLUME 902

Request (First authority, resource 912, Byte range: 2000-3000, operation) 920

CACHE VOLUME 904

MULTI-PROTOCOL LOCK MANAGER FOR DISTRIBUTED LOCK MANAGEMENT

CROSS REFERENCE TO RELATED APPLICATIONS & PRIORITY CLAIM

The present application claims priority to and the benefit of Indian Provisional Patent Application No. 202041048165 filed Nov. 4, 2020, which is hereby incorporated by reference in its entirety as if fully set forth below and for all applicable purposes.

TECHNICAL BACKGROUND

The present description relates to accessing resources, and more specifically, to a system, method, and machine-readable storage medium for accessing resources based on a distributed lock management system for efficiency and/or load balancing.

BACKGROUND

Networks and distributed storage allow data and storage space to be shared between devices located anywhere a connection is available. These implementations may range from a single machine offering a shared drive over a home network to an enterprise-class cloud storage array with multiple copies of data distributed throughout the world. Larger implementations may incorporate Network Attached Storage (NAS) devices, Storage Area Network (SAN) devices, and other configurations of storage elements and controllers to provide data and manage its flow. Storage nodes or servers in storage networks generally store data across multiple data storage devices that together include a data container, which may also be referred to herein as an aggregate. Storage nodes may employ various forms of local data storage devices, such as hard disk drives, solid state drives, flash drives, or tape devices, as well as remote data storage devices, such as cloud storage devices or repositories, for example.

The data storage devices may host one or more data stores or volumes within the aggregates, which are associated with file systems that define an overall logical arrangement of storage space in a storage network. An origin, such as a node, a computing device, a virtual machine, etc., may store resources such as files that are accessible to client devices over a network. To improve performance of a storage network, a cache volume located on a storage node may act as a cache for an origin volume that is located on a different storage node. The cache volume may be implemented at locations more proximate to the client devices and may be used to, for example, speed access to remote data and/or to offload traffic from heavily accessed volumes. For example, a cache volume may directly serve read requests if it contains the data requested by a client. If the cache volume does not contain the requested data, the cache volume may request the data from the origin volume and store the data in the cache volume before serving the client request. Subsequent read requests for the data may then be served directly from the cache volume.

A client device may transmit a request to a cache to perform an operation on a resource. Prior to executing the operation, the cache may obtain a lock authority against the resource. The cache may obtain a lock authority, which may enable the cache to grant locks to clients and perform certain actions. The lock may specify certain actions that the cache may be allowed to perform on the resource and/or may correspond to certain actions that other caches will be denied from performing on the resource while the cache holds the lock. After obtaining the lock, the cache may execute the operation on the resource and subsequently may release the lock, thus freeing the resource for other operations by other caches.

While caching data can reduce latency for responding to client requests, current approaches have limitations in their ability for reducing latency for clients storing content in the distributed storage system.

BRIEF DESCRIPTION OF THE DRAWINGS

The present disclosure is best understood from the following detailed description when read with the accompanying figures.

DETAILED DESCRIPTION

Figure 1:
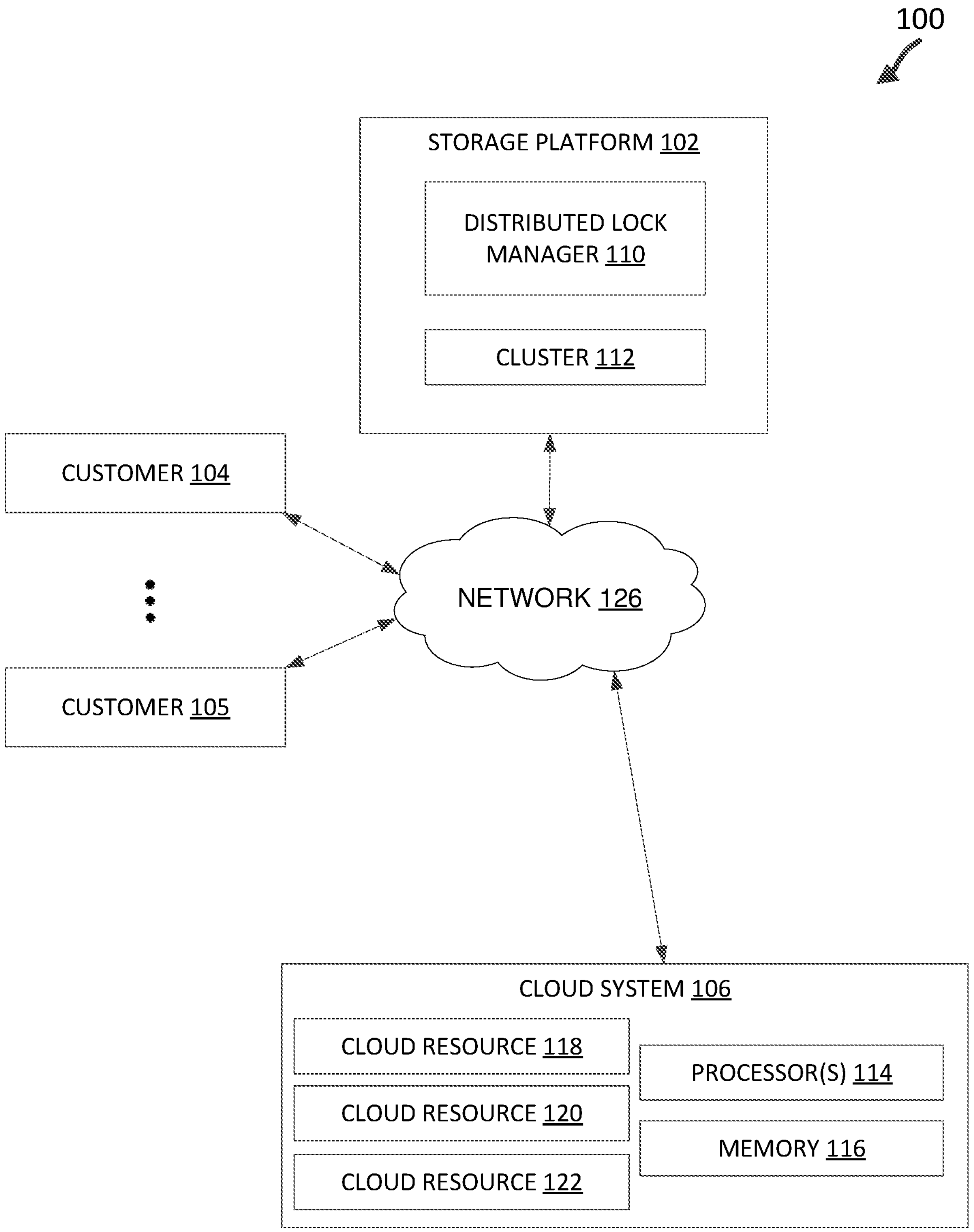
FIG. 1 illustrates a cloud provider environment in accordance with one or more aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for distributing a set of locks for a resource stored at multiple endpoints, delegating a set of authorities for a resource to multiple endpoints, and/or creating locks based on a granted authority. This may be accomplished with one or more distributed lock manager components and one or more endpoints, detailed in the examples further below. An endpoint may be, for example, an origin or a cache. A first distributed lock manager may manage, based on an authority held by an origin, access to resources stored at the origin, and a second distributed lock manager may manage, based on an authority held by a cache, access to resources stored at the cache.

For example, the first and second distributed lock managers may track, request, and/or surrender authorities and/or locks on resources stored at multiple sites. An authority and/or a lock held by a first endpoint (e.g., origin or cache) specifies a set of actions that the first endpoint has permission to perform on the resource and a set of actions that other endpoints (e.g., endpoints other than the first endpoint) are denied from performing on the resource. The set of actions that the first endpoint has permission to perform on the resource may be referred to as an allowed disposition, and the set of actions that the other endpoints are denied from performing on the resource may be referred to as a denied disposition. If the endpoint holds an authority, the endpoint may create a lock, based on the authority, against the resource and perform an operation on the resource, where the operation that is performed is included in the allowed disposition of the lock.

Initially, the origin may have all authority to perform actions and deny actions on the resources so that the origin can grant/implement one or more locks in order to process operations from host devices. The origin may be the centralized authority that serves data (e.g., resources) to host devices and to caches. The origin may store an origin dataset, portions of which may be cached at multiple sites. The cache may be a persistent, partial copy of the origin dataset and may be closer to a point of access than the origin. As reads are passed through the cache, the cache may fill up by storing requested data.

When a cache receives a request to perform an operation on a resource, the cache may determine whether it has the requisite authority to perform the requested operation. If the cache does not have the requisite authority, the cache may request a first authority from the origin. If the origin delegates the first authority to the cache, the cache may then have the requisite authority to create a lock based on that authority and perform the requested operation. Rather than surrender the authority, the cache may hold onto the authority until requested to surrender a portion of or all of the authority.

A plurality of authorities and/or locks against a resource may be held by multiple endpoints (e.g., an origin and one or more caches). Multiple requests (e.g., retrieve requests, downgrade requests, requests to perform an operation on resource) may be simultaneously processed by different endpoints. As a result, distributed storage platforms according to embodiments of the present disclosure provide for network efficiency better than previous methods for managing access to shared resources. For example, a cache that holds onto an authority may save a network trip to the origin and may satisfy subsequent requests associated with the authority.

Additionally, a cache may store frequently accessed portions of a source of data in a way that allows the data to be served faster and/or more efficiently than it would be by fetching the data from the source. The cache may serve data faster than the origin, if for example, the data storage device on which the cache resides is faster than the data storage device on which the origin resides. In an example, the storage space for the cache may be physically closer to the host device requesting access to the resource, such that it does not take as long to reach the data. The cache may provide a remote caching capability for the origin, simplifying file distribution, reducing wide area network (WAN) latency, and/or lowering WAN bandwidth costs. The cache may provide improved performance by providing load distribution, reduced latency by locating data closer to the point of client access, and/or enhanced availability (e.g., by serving cached data when faced with network connectivity issues with the origin dataset). In an example, the cache may be beneficial in read-intensive environments where data is accessed more than once and is shared by multiple hosts. As a result of embodiments of the present disclosure, operation of distributed storage systems may be improved by managing the delegation of authorities and/or locks on resources, etc., with corresponding improvements in latency, throughput, and performance in general.

FIG. 1 illustrates a cloud provider environment 100 in accordance with one or more aspects of the present disclosure. The cloud provider environment 100 may include, among other things, a storage platform 102, one or more customers 104, 105, and a cloud system 106. These aspects of the cloud provider environment 100 may communicate with each other via a network 126. The network 126 may be, for example, the Internet, a local area network (LAN), a wide area network (WAN), and/or a wireless network (to name a few examples). The network 126 may include a variety of transmission media including cables, optical fibers, wireless routers, firewalls, switches, gateways, and/or other devices to facilitate communications between one or more of the aspects of the environment 100.

Cloud system 106 may be a provider of cloud infrastructure for one or more customers 104, 105 (representing generally any number of customers, with two as a simple example). Cloud system 106 may provide a variety of cloud computing solutions, such as infrastructure as a service (IaaS), software as a service (SaaS), and/or platform as a service (PaaS) as some examples. For example, cloud system 106 may be a public cloud provider, examples of which include Amazon Web Services™ (AWS™), Microsoft® Azure®, and Google Cloud Platform™. These are by way of illustration. The cloud system 106 may represent a multi-tenant cloud provider that may host a variety of virtualization tools that customers 104, 105 may request to host or otherwise run one or more applications (e.g., via the network 126). Alternatively (or additionally), the cloud system 106 may represent a private cloud provider, such as an enterprise cloud for a given organization.

Cloud system 106, generally, may provide infrastructure including any set of resources used for executing one or more containers, virtual machines, or other hosted virtualization tool(s). Resources may include CPU resources, memory resources, caching resources, storage space resources, communication capacity resources, etc. that a virtualization tool such as a container may use for execution of one or more workloads for customers 104, 105. These resources are illustrated in FIG. 1 as cloud resources 118, 120, and 122 of cloud system 106. These may represent any number of cloud resources in any of a variety of combinations. As just one example, the cloud resources 118-122 may be in the form of one or more AWS EC2™ instances, or other instance type from a cloud provider.

Cloud system 106 may further include a processor 114, which may be one or more processors such as multiple processors. The processor 114 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 114 may also be implemented as a combination of computing devices, e.g., a combination of a DSP and a microprocessor, a plurality of microprocessors, one or more microprocessors in conjunction with a DSP core, or any other such configuration.

The processor 114 may be connected to memory 116 to execute one or more instructions stored in the memory 116 by the processor 114. The memory 116 may include a cache memory (e.g., a cache memory of the processor 114), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 116 includes a non-transitory computer-readable medium. The memory 114 may store, or have recorded thereon, instructions. The instructions may include instructions that, when executed by the processor 114, cause the processor 114 to perform the operations described herein, such as for hosting one or more containers. Instructions may also be referred to as machine executable code. The machine executable code may be for causing a device to perform these operations, for example by causing one or more processors to control or command the device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The environment 100 may include storage platform 102. Storage platform 102 is illustrated as separate from cloud system 106, though it may be an example of a cloud resource (e.g., cloud resources 118, 120, 122), as storage platform 102 may be hosted and/or managed by a different entity than the cloud system 106 (e.g., a different provider for storage than a public cloud provider), but operate in cooperation with the cloud system 106 to provide storage services to one or more requests from customer 104, 105.

The storage platform 102 may include a distributed lock manager 110 and a cluster 112, such as, for example, a Kubernetes® cluster or a Docker Swarm®. These may be executed by a processor or multiprocessor (such as one or more of the examples given above with respect to processor 114), memory (such as one or more of the examples given above with respect to memory 116). These may include instructions which, when executed by the processor(s) for the storage platform 102, cause the processor to perform the operations described herein with respect to creating locks against resources, maintaining delegation and authority information, and/or surrendering, requesting, and/or granting authorities for a resource.

For example, while illustrated as separate from cloud system 106, the cluster 112 may, itself, be hosted by the cloud system 106 as a software-defined environment in which the storage platform 102 may make storage decisions according to embodiments of the present disclosure. In other examples, the storage platform 102 may include its own processor(s), memory(ies), and other resources that interface with the cloud system 106 with the instructions. The cloud system 106 and the storage platform 102 may be jointly owned or owned by separate entities. The cloud system 106 and the storage platform 102 may be co-located to improve storage access speed or they may be located in different data centers. The cloud system 106 and the storage platform 102 may work jointly to provide storage options to customers 104, 105 that are utilizing the capabilities of cloud system 106. The cloud system 106 may provide seamless access to the storage platform 102 for ease of use by the customers 104, 105.

According to embodiments of the present disclosure, cloud system 106 may function as a storage service for storage platform 102. That is, cloud system 106 may support storage platform 102 in providing storage as a service (SaaS) to customers, including customers 104, 105. Storage platform 102 may include a storage operating system (OS) that specializes in providing advanced storage functions, such as deduplication, compression, synchronization, replication, snapshot creation/management, disaster recovery, backup and archive, high availability storage, cloning functionality, data tiering, encryption, multi-platform access, etc. In an example, the storage OS may execute within a storage virtual machine, a cloud computing cluster, or other computing environment. The storage OS may implement a storage file system to logically organize data within storage devices as one or more storage objects and provide a logical/virtual representation of how the storage objects are organized on the storage devices. A storage object may include any logically definable storage element stored by the storage operating system (e.g., a volume stored by a node, a cloud object, etc.). Each storage object may be associated with a unique identifier that uniquely identifies the storage object. For example, a volume may be associated with a volume identifier uniquely identifying that volume from other volumes. The storage OS may also manage client access to the storage objects.

The storage OS may implement a file system for logically organizing data. For example, the storage OS may implement a write anywhere file layout for a volume where modified data for a file may be written to any available location. In an example, the file system may be implemented through a file system layer that stores data of the storage objects in an on-disk format representation that is block-based (e.g., data is stored within 4 kilobyte blocks and inodes are used to identify files and file attributes such as creation time, access permissions, size, and block location, etc.). Other representations may be used instead or in addition. The storage OS may allow client devices to access data (e.g., through cloud system 106 in some examples) stored within the storage platform 102 using various types of protocols, such as Server Message Block (SMB), Common Internet File System (CIFS), Internet Small Computer Systems Interface (iSCSI), and/or other protocols.

In some examples, customers 104, 105 using the storage platform 102 may request that an operation be performed on the storage platform 102. The storage platform 102 may, in turn, pass the request to the cloud system 106 for processing and handling. The storage platform 102 includes a cluster 112 including an origin volume and one or more cache volumes that cache a subset of the data stored at the origin volume.

For example, multiple distributed lock manager components (also referred to herein as a distributed lock managers) in the storage platform 102 may control access by customers 104, 105 to data stored in the cluster 112. Data stored at the origin volume or the cache volume in the cluster may also be referred to as a resource. For example, customers 104,

105 may transmit requests for operations to be performed on resources stored in the cluster 112. Before an endpoint (e.g., origin volume or cache volume) may satisfy a request, a distributed lock manager may determine whether the endpoint has a requisite authority to satisfy the request.

A first distributed lock manager component that guards access to resources stored at the origin volume may delegate authorities for resources cached at cache volumes and track the delegation of authorities. An authority specifies a first set of actions that an endpoint has permission to perform on the resource and a second set of actions that other endpoints are denied from performing on the resource. The first distributed lock manager component may determine whether the origin volume has a requisite authority to perform a requested operation on a resource stored at the cache volume. If the origin volume has the requisite authority, the origin volume may create a lock based on that authority and then perform the requested operation. If the origin volume does not have the requisite authority, then the origin volume may transmit, to a set of cache volumes, a set of downgrade requests to surrender a set of authorities. If each cache volume of the set of cache volumes surrenders the authority requested in the respective downgrade request, then the origin volume may hold the requisite authority to satisfy the request.

A second distributed lock manager component that guards access to resources stored at the cache volume may determine whether the cache volume has a requisite authority to perform a requested operation on a resource stored at the cache volume. If the cache volume has the requisite authority, the cache volume may create a lock based on that granted authority and then perform the requested operation. If the cache volume does not have the requisite authority, then the cache volume may transmit, to the origin volume, a retrieve request to obtain a first authority. If the origin volume satisfies the retrieve request and accordingly delegates the first authority to the cache volume, then the cache volume may hold the requisite authority to satisfy the request.

A plurality of authorities for a shared resource may be distributed among multiple sites (e.g., origin volume and one or more cache volumes). As described herein, the storage platform 102 may provide reduced latency and a better user experience for customers 104, 105. For example, a cache volume may hold onto an authority until the cache volume receives a request to surrender the authority. In this example, the cache volume may continue to service requests based on holding the authority, without consulting with the origin volume. Accordingly, the cache volume may save a network trip to the origin volume and satisfy these subsequent requests.

Figure 2:
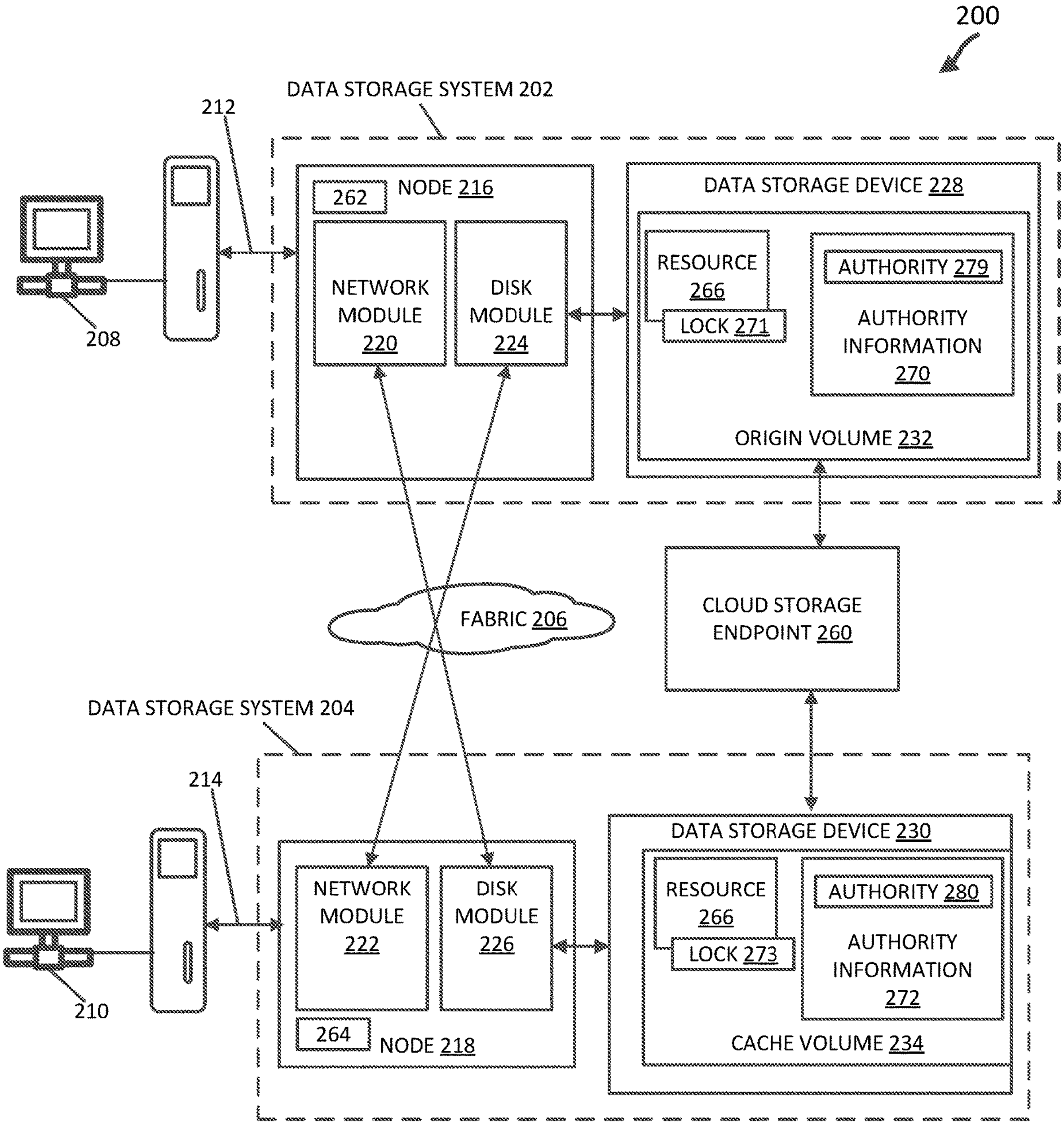
FIG. 2 is a block diagram illustrating a clustered network environment in accordance with one or more aspects of the present disclosure.

FIG. 2 is a block diagram illustrating a clustered network environment 200 in accordance with one or more aspects of the present disclosure. The clustered network environment 200 includes data storage systems 202 and 204 that are coupled over a cluster fabric 206, such as a computing network embodied as a private InfiniBand, Fiber Channel (FC), or Ethernet network facilitating communication between the data storage systems 202 and 204 (and one or more modules, components, etc. therein, such as, nodes 216 and 218, for example). The data storage systems 202 and 204 may communicate via, for example, the cluster fabric 206. The clustered data storage systems 202 and 204 may correspond to cluster 112 in FIG. 1.

It will be appreciated that while two data storage systems 202 and 204 and nodes 216 and 218 are illustrated in FIG. 2, any suitable number of such components is contemplated. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner. It will be further appreciated that clustered networks are not limited to any particular geographic areas and can be clustered locally and/or remotely. Thus, in an embodiment a clustered network can be distributed over a plurality of storage systems and/or nodes located in a plurality of geographic locations; while in an embodiment a clustered network can include data storage systems (e.g., 202, 204) residing in a same geographic location (e.g., in a single onsite rack of data storage devices).

In an example, nodes 216, 218 include storage controllers (e.g., node 216 may include a primary or local storage controller, and node 218 may include a secondary or remote storage controller) that provide client devices, such as host devices 208 and 210, with access to data stored within data storage devices 228 and 230. In the example illustrated in FIG. 2, one or more host devices 208, 210 which may include, for example, client devices, personal computers (PCs), computing devices used for storage (e.g., storage servers), and other computers or peripheral devices (e.g., printers), are coupled to the respective data storage systems 202, 204 by storage network connections 212, 214. A network connection 212, 214 may include a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as AMAZON S3®, etc.

The host devices 208, 210 may be general-purpose computers running applications, and may interact with the data storage systems 202, 204 using a client/server model for exchange of information. For example, the host device 208 may request data from the data storage system 202, 204 (e.g., data on a storage device managed by a network storage control configured to process I/O commands issued by the host device for the storage device), and the data storage system 202, 204 may return results of the request to the host device via the storage network connection 212, 214. The host devices 208, 210 may correspond to customers 104, 105 in FIG. 1.

The nodes 216, 218 on clustered data storage systems 202, 204 may include network or host nodes that are interconnected as a cluster to provide data storage and management services, such as to an enterprise having remote locations, cloud storage (e.g., a cloud storage endpoint 260 may be stored within a data cloud), etc., for example. Such a node in the clustered network environment 200 may be a device attached to the network as a connection point, redistribution point or communication endpoint, for example. A node may send, receive, and/or forward information over a network communications channel, and may include any device that meets any or all of these criteria. An example of a node may be a data storage and management server attached to a network, where the server may include a general-purpose computer or a computing device particularly configured to operate as a server in a data storage and management system.

In an example, a first cluster of nodes such as the nodes 216, 218 (e.g., a first set of storage controllers configured to provide access to a first storage aggregate including a first logical grouping of one or more storage devices) may be located on a first storage site. A second cluster of nodes, not illustrated, may be located at a second storage site (e.g., a second set of storage controllers configured to provide access to a second storage aggregate including a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 200, nodes 216, 218 may include various functional components that coordinate to provide a distributed storage architecture for the cluster. For example, the nodes may include network modules 220, 222 and disk modules 224, 226. The network modules 220, 222 may be configured to allow the nodes 216, 218 (e.g., network storage controllers) to connect with host devices 208, 210 over the storage network connections 212, 214, for example, allowing the host devices 208, 210 to access data stored in the distributed storage system. Further, the network modules 220, 222 may provide connections with one or more other components through the cluster fabric 206. For example, in FIG. 2, the network module 220 of the node 216 may access a second data storage device by sending a request through the disk module 226 of the node 218.

Disk modules 224, 226 may be configured to connect one or more data storage devices 228, 230, such as disks or arrays of disks, flash memory, or some other form of data storage, to the nodes 216, 218. The nodes 216, 218 may be interconnected by the cluster fabric 206, for example, allowing respective nodes in the cluster to access data on data storage devices 228, 230 connected to different nodes in the cluster. Disk modules 224, 226 may communicate with the data storage devices 228, 230 according to the SAN protocol, such as SCSI or FCP, for example. As seen from an operating system on nodes 216, 218, the data storage devices 228, 230 may appear as locally attached to the operating system. Accordingly, different nodes 216, 218, etc. may access data blocks through the operating system, rather than expressly requesting abstract files.

It should be appreciated that, while the clustered network environment 200 illustrates an equal number of network and disk modules, other embodiments may include a differing number of these modules. For example, there may be a plurality of network and disk modules interconnected in a cluster that does not have a one-to-one correspondence between the network and disk modules. That is, different nodes may have a different number of network and disk modules, and the same node may have a different number of network modules than disk modules.

Further, host devices 208, 210 may be networked with the nodes 216, 218 in the cluster, over the storage networking connections 212, 214. As an example, respective host devices 208, 210 that are networked to a cluster may request services (e.g., exchanging of information in the form of data packets) of nodes 216, 218 in the cluster, and the nodes 216, 218 may return results of the requested services to the host devices 208, 210. In an embodiment, the host devices 208, 210 may exchange information with the network modules 220, 222 residing in the nodes 216, 218 (e.g., network hosts) in the data storage systems 202, 204.

In an embodiment, the data storage device 228 includes an origin volume 232, and the data storage device 230 includes a cache volume 234. The origin volume 232 and/or cache volume 234 may include an implementation of storage of information onto disk drives or disk arrays or other storage (e.g., flash) as a file system for data, for example. In an example, a disk array may include all traditional hard drives, all flash drives, or a combination of traditional hard drives and flash drives. Volumes may span a portion of a disk, a collection of disks, or portions of disks, for example, and typically define an overall logical arrangement of file storage on disk space in the storage system. In an embodiment a volume may include stored data as one or more files that reside in a hierarchical directory structure within the volume.

Volumes are typically configured in formats that may be associated with particular storage systems, and respective volume formats typically include features that provide functionality to the volumes, such as providing an ability for volumes to form clusters. For example, a first storage system may utilize a first format for their volumes, and a second storage system may utilize a second format for their volumes, where the first and second formats are different from each other.

In the clustered network environment 200, the host devices 208, 210 may utilize the data storage systems 202, 204 to store and retrieve data from and/or modify data stored on the origin volume 232 and/or the cache volume 234. For example, the host device 208 may send data packets to the network module 220 in the node 216 within data storage system 202. The node 216 may forward the data to the data storage device 228 using the disk module 224, where the data storage device 228 includes the origin volume 232. In this example, the host device 208 may access the origin volume 232, to store, modify, and/or retrieve data, using the data storage system 202 connected by the storage network connection 212. Further, the host device 210 may exchange data with the network module 222 in the node 218 within the data storage system 204 (e.g., which may be remote from the data storage system 202). The node 218 may forward the data to the data storage device 230 using the disk module 226, thereby accessing cache volume 234 associated with the data storage device 230. While host device 208 is illustrated as communicating with data storage system 202, and similarly host device 210 with data storage system 204, the host devices 208, 210 may communicate via the network (e.g., via fabric 206) with other storage systems without requiring traversal through storage systems 202, 204 respectively (as just one example). Thus, if data storage system 202 is down, then the host device 208 may still access data via data storage system 204 or some other cluster at another site.

A geographically distributed lock management system may be part of the clustered network environment 200. Aspects of the distributed lock manager 262 may be incorporated into the data storage system 202 (e.g., in the network module 220 and/or the disk module 224). Similarly, aspects of the distributed lock manager 264 may be incorporated into the data storage system 204. It should be understood that reference to the origin volume 232 performing an action (e.g., receiving, transmitting, determining, storing, updating, etc.) may refer to the distributed lock manager 262 performing such an action and that reference to the cache volume 234 performing an action (e.g., receiving, transmitting, determining, storing, updating, etc.) may refer to the distributed lock manager 264 performing such an action.

A distributed lock manager 262, 264 may coordinate access to shared resources stored at geographically distributed sites. Resources may be shared and stored at multiple endpoints (e.g., the origin volume 232 and/or a cache volume 234) in the distributed storage system. A resource may refer to data as, for example, one or more files that reside (e.g., in a directory structure) within a volume. In the example illustrated in FIG. 2, the origin volume 232 stores the resource 266 and authority information 270. The authority information 270 may include an authority 279 specifying a first set of actions that the origin volume 232 has permission to perform on the resource 266 and a second set of actions that other endpoints (e.g., endpoints other than the origin volume 232) are denied from performing on the resource 266. The set of actions that an endpoint has permission to perform on a resource may also be referred to as a set of allowed actions or an allowed disposition, and the second set of actions that a set of endpoints are denied from performing on the resource may also be referred to as a set of denied actions or a denied disposition. The allowed disposition and the denied disposition may correspond to a particular operation to be performed on a resource. The origin volume 232 may delegate one or more authorities to cache volumes.

The origin volume 232 may be the centralized authority that serves data (e.g., resources) to host devices and cache volumes 234. The cache volumes may communicate with the origin volume 232, without communicating directly with each other. The origin volume 232 may store an origin dataset, portions of which may be cached at multiple sites. The cache volume 234 may be a persistent, partial copy of the origin dataset and may be closer to a point of access than the origin volume 232. To perform an operation on the resource 266, the distributed lock manager 262 and/or the origin volume 232 may create a lock 271 based on the authority 279 and perform the operation the resource 266.

Caches may store frequently accessed portions of a source of data in a way that allows the data to be served faster and/or more efficiently than it would be by fetching the data from the source. The cache volume 234 may serve data faster than the origin volume 232, if for example, the data storage device on which the cache volume resides is faster than the data storage device on which the origin volume resides. In an example, the cache volume 234 may have faster storage (e.g., FC versus SATA), increased processing power, and/or increased (or faster) memory compared to the origin volume 232. In another example, the storage space for the cache volume 234 may be physically closer to the host device (e.g., host device 210) requesting access to the resource, such that it does not take as long to reach the data. The cache volume 234 may be a temporary storage location that resides between a host device (e.g., the host device 210) and the origin volume 232.

The cache volume 234 may provide a remote caching capability for the origin volume 232, simplifying file distribution, reducing WAN latency, and/or lowering WAN bandwidth costs. The cache volume 234 may provide improved performance by providing load distribution, reduced latency by locating data closer to the point of client access, and/or enhanced availability (e.g., by serving cached data when faced with network connectivity issues with the origin dataset). In some examples, the cache volume 234 may be beneficial in read-intensive environments where data is accessed more than once and is shared by multiple hosts. Additionally or alternatively, the cache volume 234 may maintain cache coherency, data consistency, and/or efficient usage of storage in a scalable and performant manner. The cache volume 234 may be populated as the host device 210 reads data from the origin volume 232. For example, the host device 210 may request a resource 266 from the cache volume 234. On a first read of any data, the cache volume 234 may fetch the requested data from the origin volume 232. For example, the origin volume 232 may transmit a copy of the requested resource 266 to the cache volume 234, which may cache the copy and then pass the requested resource back to the host device 210. As reads are passed through the cache volume 234, the cache volume 234 may fill up by storing the requested data.

In the example illustrated in FIG. 2, the cache volume 234 stores the resource 266 and authority information 272. The authority information 272 may include an authority 280 specifying a set of actions that the cache volume 234 has permission to perform on the resource 266 and a set of actions that other endpoints (e.g., endpoints other than the cache volume 234) are denied from performing on the resource 266. To perform an operation on the resource 266, the distributed lock manager 264 and/or the cache volume 234 may create a lock 273 based on the authority 280 and then perform the operation on the resource 266. A distributed lock manager may create a lock and release the lock based on performing operations. For example, the distributed lock manager 264 that guards access to the resource 266 stored at the cache volume 234 may receive a request to perform an "open" operation on the resource 266 from the host device 210. The "open" operation may cause the distributed lock manager 264 to create the lock 273 under the authority 280 requested and obtained from the origin volume 232. The distributed lock manager 264 may release the lock 273 at the cache volume 234 based on receiving a "close" operation on the resource 266 from the host device 210. Although the lock 273 is released based on the "close" operation, the authority 280 is not returned to the origin volume 232. Accordingly, the authority 280 may continue to be held at cache volume 234 for honoring subsequent lock requests, even after the cache volume has released the lock.

In the example illustrated in FIG. 2, the lock 271 on the resource 266 stored at origin volume 232 and the lock 273 on the cached resource 266 stored at the cache volume 234 are distributed among different sites. The endpoint creates a lock based on an authority held by the endpoint. From the origin's perspective, the authority for a resource may act as an extended lock against the resource. From the cache's perspective, the authority acts as an umbrella under which more locks may be created or granted. More details on the authorities and locks are provided below in aspects of, for example, FIGS. 4-12.

Although one resource 266 is shown as being stored on the origin volume 232 and the cache volume 234, it should be understood that more than one resource may be stored on the origin volume 232 and the cache volume 234. Additionally or alternatively, a distributed lock manager (e.g., distributed lock manager 262 or distributed lock manager 264) may manage access to resources stored at multiple endpoints and not solely the ones described above. For example, the distributed lock manager 264 may manage access to resources stored the cache volume 234 and other cache volumes.

The data storage system 202, 204 may be associated with a cloud system (e.g., cloud system 106 in FIG. 1) including a cloud storage endpoint 260. The cloud storage endpoint 260 may be an external data store that may store one or more distributed lock managers, one or more resources, one or more locks, one or more authorities, or a combination of distributed lock managers, resources, locks, and/or authorities. In an example, the authority and/or the lock held by an endpoint may be stored in a memory of a cloud instance of a virtual machine instance (e.g., node/VM that is the origin volume 232) separate from the endpoint. The authority or the lock may be stored in persistent storage (e.g., files on disk). For example, the authority or the lock may be stored at the cache in cache memory or at the origin in origin memory. In an embodiment, the distributed lock manager may store locks and authorities on-disk and may fetch locks or authorities on-demand into memory for usage.

Figure 3:
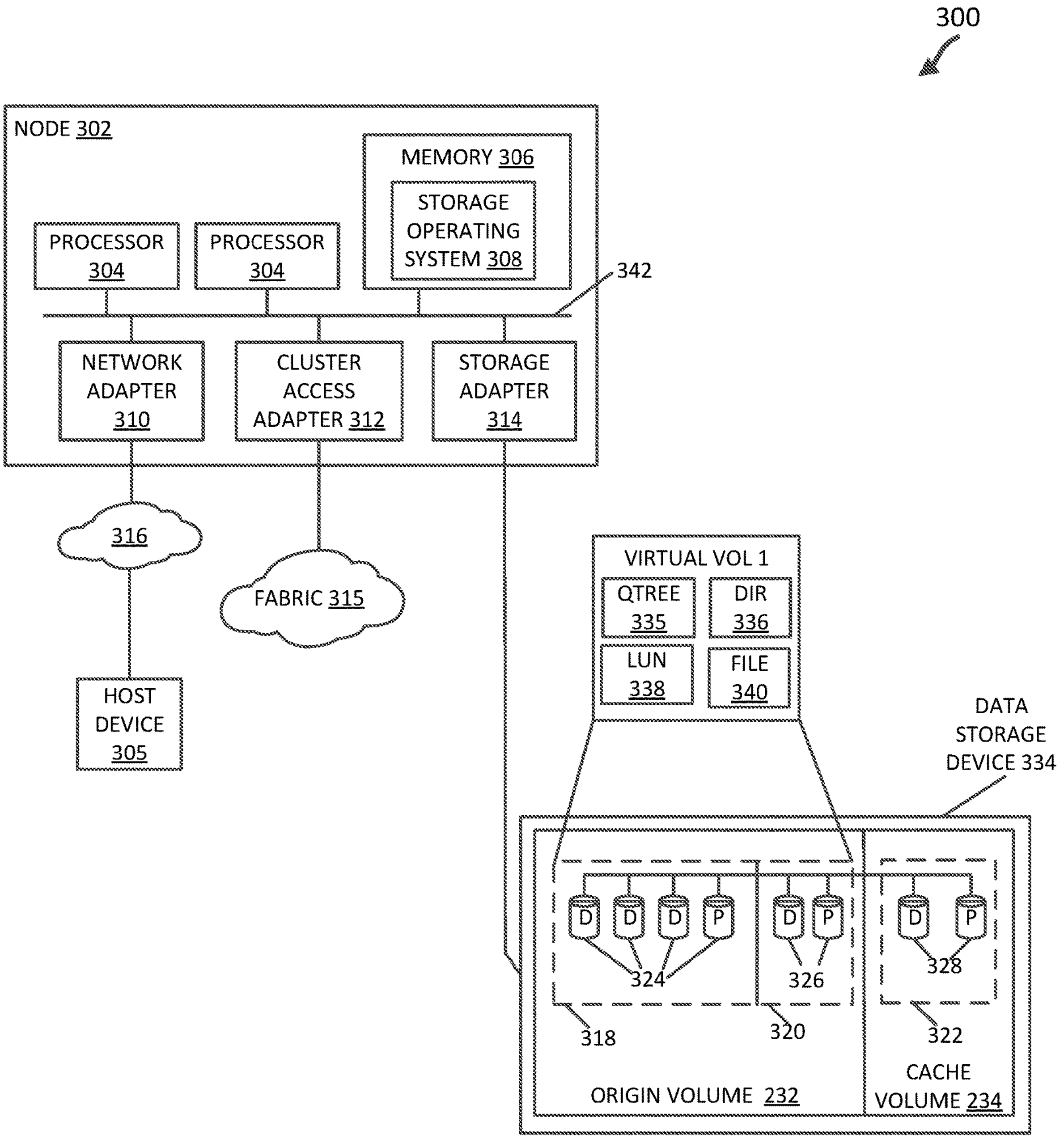
FIG. 3 is an illustrative example of a data storage system in accordance with one or more aspects of the present disclosure.

FIG. 3 is an illustrative example of a data storage system 300 (e.g., data storage system 202, 204 in FIG. 2), in accordance with one or more aspects of the present disclosure. The data storage system 300 includes a node 302 (e.g., nodes 216, 218 in FIG. 2) and a data storage device 334 (e.g., data storage devices 228, 230 in FIG. 2). The node 302 may be a general-purpose computer, for example, or some other computing device particularly configured to operate as a storage server. A host device 305 (e.g., host device 208, 210 in FIG. 2) may be connected to the node 302 over a network 316, for example, to provide access to files and/or other data stored on the data storage device 334. The node 302 may include a storage controller that provides client devices, such as the host device 305, with access to data stored within data storage device 334.

The data storage device 334 can include mass storage devices, such as disks 324, 326, 328 of a disk array 318, 320, 322. It will be appreciated that the techniques and systems, described herein, are not limited by the example illustrated in FIG. 3. For example, disks 324, 326, 328 may include any type of mass storage devices, including but not limited to magnetic disk drives, flash memory (e.g., SSDs), and any other similar media adapted to store information, including, for example, data (D) and/or parity (P) information.

The node 302 includes one or more processors 304, a memory 306, a network adapter 310, a cluster access adapter 312, and a storage adapter 314 interconnected by a system bus 342. The network adapter 310 may correspond to and/or be an example of the network module 220 in FIG. 2. The storage adapter 314 may correspond to and/or be an example of the disk module 224 in FIG. 2. The data storage system 300 also includes an operating system 308 installed in the memory 306 of the node 302 that can, for example, implement a Redundant Array of Independent (or Inexpensive) Disks (RAID) optimization technique, or error correction coding (to name just a few examples), to optimize a reconstruction process of data of a failed disk in an array. The operating system 308 may manage communications for the data storage system 300, and communications between other data storage systems that may be in a clustered network, such as attached to a cluster fabric 315 (e.g., cluster fabric 206 in FIG. 2). Thus, the node 302, such as a network storage controller, can respond to host device requests to manage data on the data storage device 334 (e.g., or additional clustered devices) in accordance with these host device requests.

The operating system 308 may include several modules or "layers" executed by one or both of the network module 220 or the disk module 224. These layers may include a file system 340 that keeps track of a hierarchical structure of the data stored in the storage devices and manages read/write operations (e.g., executes read/write operations on storage in response to client requests). The operating system 308 may establish one or more file systems on the data storage system 300, where a file system can include software code and data structures that implement a persistent hierarchical namespace of files and directories, for example. The file system may logically organize stored information as a hierarchical structure for files/directories/objects at the storage devices. Each "on disk" file may be implemented as a set of blocks configured to store information, such as text, whereas a directory may be implemented as a specially formatted file in which other files and directories are stored. These data blocks may be organized within a volume block number (VBN) space that is maintained by a file system of the storage operating system 308. The file system may also assign each data block in the file a corresponding "file offset" or a file block number (FBN). The file system may assign sequences of FBNs on a per-file basis, whereas VBNs may be assigned over a larger volume address space. The file system may organize the data blocks within the VBN space as a logical volume. The file system may be composed of a contiguous range of VBNs from zero to n, for a file system of size n−1 blocks, where n is a number greater than 2. In an example, when a new data storage device (not shown) is added to a clustered network system, the operating system 308 is informed where, in an existing directory tree, new files associated with the new data storage device are to be stored. This is often referred to as "mounting" a file system.

In the example data storage system 300, memory 306 may include storage locations that are addressable by the processors 304 and network adapter 310, cluster access adapter 312, and/or storage adapter 314 for storing related software application code and data structures. The processors 304, the network adapter 310, the cluster access adapter 312, and/or the storage adapter 314 may, for example, include processing elements and/or logic circuitry configured to execute the software code and manipulate the data structures. The operating system 308, portions of which are typically resident in the memory 306 and executed by the processing elements, functionally organizes the storage system by, among other things, invoking storage operations in support of a file service implemented by the storage system. It will be apparent that other processing and memory mechanisms, including various computer readable media, may be used for storing and/or executing application instructions pertaining to the techniques described herein. For example, the operating system may also utilize one or more control files (not shown) to aid in the provisioning of virtual machines.

The network adapter 310 includes the mechanical, electrical and signaling circuitry for connecting the data storage system 300 to the host device 305 over the network 316, which may include, among other things, a point-to-point connection or a shared medium, such as a LAN. The network adapter 310 may also connect the data storage system 300 to the cloud tier (e.g., cloud storage endpoint 260 in FIG. 2). The host device 305 may be a general-purpose computer configured to execute applications. As described above, the host device 305 may interact with the data storage system 300 in accordance with a client/host model of information delivery.

The storage adapter 314 cooperates with the operating system 308 executing on the node 302 to access information requested by the host device 305 (e.g., access data on a storage device managed by a network storage controller). The information may be stored on any type of attached array of writeable media such as magnetic disk drives, flash memory, and/or any other similar media adapted to store information. In the example data storage system 300, the information may be stored in data blocks on the disks 324, 326, 328. The storage adapter 314 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information may be retrieved by the storage adapter 314 and, in some examples, processed by the one or more processors 304 (or the storage adapter 314 itself) prior to being forwarded over the system bus 342 to the network adapter 310 (and/or the cluster access adapter 312 if sending to another node in the cluster) where the information is formatted into a data packet and returned to the host device 305 over the network 316 (and/or returned to another node attached to the cluster over the cluster fabric 315). In some examples, the network adapter 310 may format the information into a data packet and forward the data packet to the cloud (e.g., cloud storage endpoint 260 in FIG. 2).

In an embodiment, storage of information on disk arrays 318, 320, 322 can be implemented as one or more storage volumes (e.g., origin volume 232 or cache volume 234) that include a cluster of disks 324, 326, 328 defining an overall logical arrangement of disk space. The disks 324, 326, 328 that include one or more volumes may be organized as one or more groups of RAIDs (while in other examples, error correction coding may be used). As an example, the origin volume 232 may include an aggregate of disk arrays 318 and 320, which may include the cluster of disks 324 and 326. In an example, to facilitate access to disks 324, 326, 328, the operating system 308 may implement a file system (e.g., write anywhere file system) that logically organizes the information as a hierarchical structure of directories and files on the disks. Accordingly, respective files may be implemented as a set of disk blocks configured to store information, whereas directories may be implemented as specially formatted files in which information about other files and directories are stored. A resource may be, for example, a file.

Whatever the underlying physical configuration within this data storage system 300, data can be stored as files within physical and/or virtual volumes, which can be associated with respective volume identifiers, such as file system identifiers (FSIDs), which can be 32-bits in length in one example. A physical volume corresponds to at least a portion of physical storage devices whose address, addressable space, location, etc. does not change, such as at least some of one or more data storage devices 334 (e.g., a Redundant Array of Independent (or Inexpensive) Disks (RAID system)). In some examples, the location of the physical volume does not change in that the (range of) address(es) used to access it may generally remain constant. A virtual volume, in contrast, may be stored over an aggregate of disparate portions of different physical storage devices. The virtual volume may be a collection of different available portions of different physical storage device locations, such as some available space from each of the disks 324, 326, and/or 328, and is not "tied" to any one particular storage device. Accordingly, a virtual volume may be said to include a layer of abstraction or virtualization, which allows it to be resized and/or flexible in some regards.

Further, a virtual volume may include one or more logical unit numbers (LUNs) 338, directories 336, and/or Qtrees 335. Among other things, these features may allow the disparate memory locations within which data is stored to be identified, for example, and grouped as a data storage unit. For example, the LUNs 338 may be characterized as constituting a virtual disk or drive upon which data within the virtual volume may be stored within the aggregate. LUNs may be referred to as virtual drives, such that they emulate a hard drive from a general-purpose computer, while they actually include data blocks stored in various parts of a volume.

One or more data storage devices 334 may have one or more physical ports, where each physical port may be assigned a target address (e.g., SCSI target address). To represent respective volumes stored on a data storage device, a target address on the data storage device 334 may be used to identify one or more LUNs 338. For example, when the node 302 connects to a volume (e.g., origin volume 232 or cache volume 234) through the storage adapter 314, a connection between the node 302 and the one or more LUNs 338 underlying the volume is created. Additionally or alternatively, respective target addresses may identify multiple LUNs, such that a target address may represent multiple volumes. The I/O interface, which may be implemented as circuitry and/or software in the storage adapter 314 or as executable code residing in memory 306 and executed by the processors 304, for example, may connect to volume (e.g., origin volume 232) by using one or more addresses that identify the one or more LUNs 338.

Figure 4:
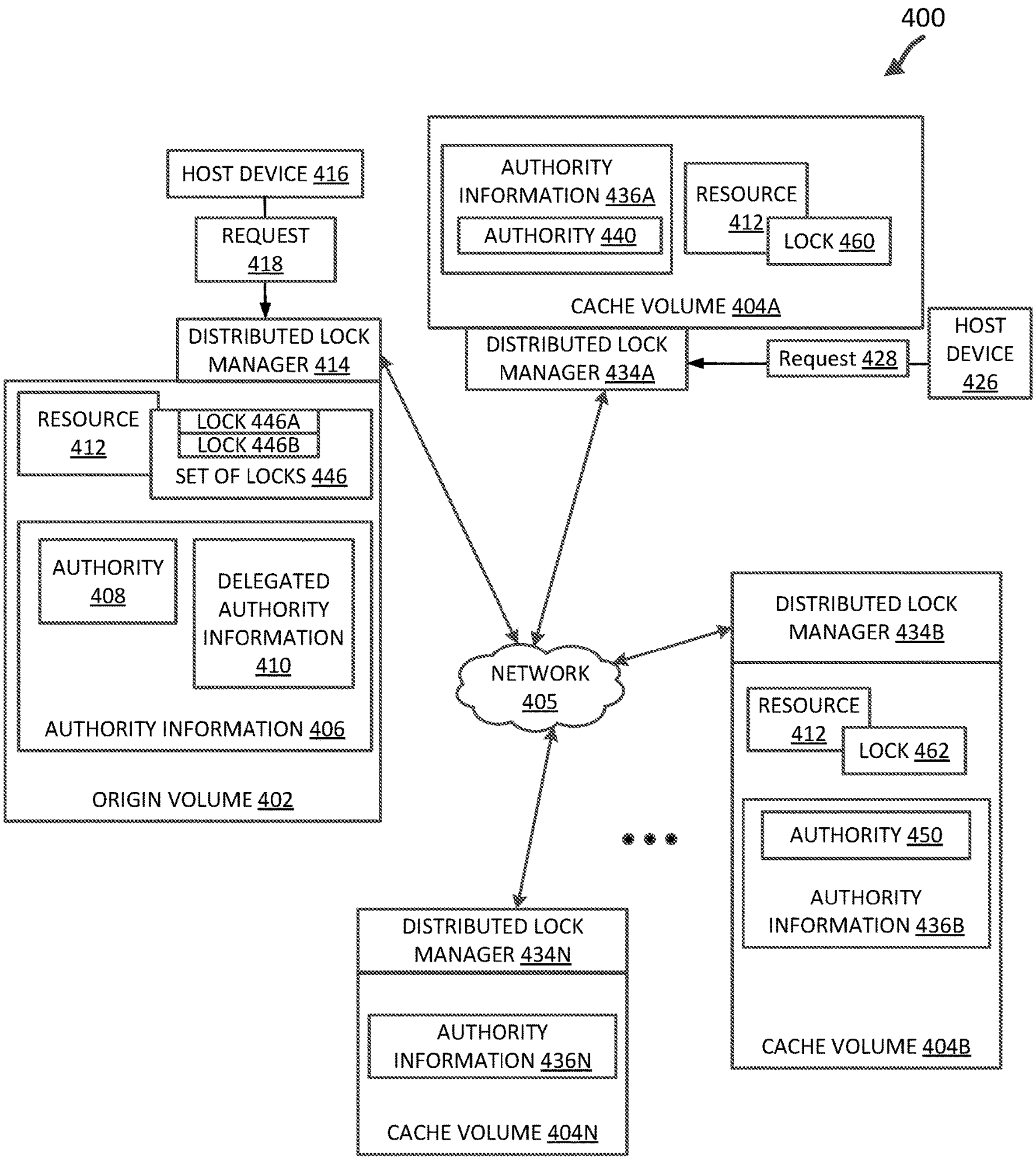
FIG. 4 is a schematic diagram of a geographically distributed lock management system according to one or more aspects of the present disclosure.

FIG. 4 is a schematic diagram 400 of a geographically distributed lock management system according to one or more aspects of the present disclosure. The example illustrated in FIG. 4 includes an origin volume 402 in communication with multiple cache volumes 404 over a network 405. The network 405 may include, for example, a LAN or a WAN. Additionally, the origin volume 402 and cache volumes 404 may communicate over the network 405 and/or over the cluster fabric 206 (shown in FIG. 2). The origin volume 402 may correspond to and/or be an example of the origin volume 402 in FIG. 2 and FIG. 3. The cache volume 404 may correspond to and/or be an example of the cache volume 234 in FIG. 2 and FIG. 3. The origin volume 402 and one or more of the cache volumes 404 (e.g., cache volume 404A, cache volume 404B, and/or cache volume 404N) may be in the same cluster or a different cluster from each other. The cache volume 404 may be a writable, persistent cache of the origin volume 402 in a location remote from the data storage device on which the origin volume 402 resides. In the present disclosure, a cache volume may also be referred to as a cache, and an origin volume may also be referred to as an origin.

It should be understood that reference to the origin volume 402 performing an action (e.g., receiving, transmitting, determining, storing, updating, etc.) may refer to a distributed lock manager 414 performing such an action and that reference to the cache volume 404 performing an action (e.g., receiving, transmitting, determining, storing, updating, etc.) may refer to a distributed lock manager 434 performing such an action. The distributed lock manager 414 may correspond to and/or be an example of the distributed lock manager 262 in FIG. 2. The distributed lock manager 434 may correspond to and/or be an example of the distributed lock manager 264 in FIG. 2. Although the distributed lock managers 414 and 434 are shown as being separate from the origin volume 402 and cache volume 404, it should be understood that in other examples the distributed lock manager 414 and 434 may be incorporated into the origin volume 402 and cache volume 404, respectively.

The distributed lock manager 414, 434 may be a multi-protocol lock manager that is agnostic to and supports various protocols (e.g., SMB, CIFS, iSCSI, etc.) used by host devices at one or more sites. For example, various locks, as discussed in more detail below, may be associated with multiple different file access protocols. The distributed lock manager 414, 434 may ensure that the actions taken are consistent with semantic requirements for each lock, as established by the associated file access protocol. The resource 412 may be cached at multiple sites and operated on from the multiple sites concurrently. The distributed lock manager may coordinate access to the shared resource 412 from geographically distributed sites. Systems and methods for providing a multi-protocol lock manager are described in further detail in U.S. Pat. No. 7,822,719, filed Nov. 19, 2007, entitled "Multi-protocol lock manager," which is incorporated herein by reference.

The origin volume 402 may store one or more resources 412 and authority information 406 may include one or more authorities, each authority corresponding to a resource. An authority may specify a first set of actions that a first endpoint has permission to perform on a resource (allowed disposition of the first endpoint) and a second set of actions that other endpoints (e.g., endpoints other than the first endpoint) are denied from performing on the resource (denied disposition of the first endpoint). In an example, the first set of actions may include a read operation, and the second set of actions may include a write operation.

A distributed lock manager 414 may guard access to the resource 412 stored at the origin volume 402. The origin volume 402 maintains authority information 406 including an authority 408 and delegated authority information 410. The authority information 406 may include an authority 408 that the origin volume 402 has for accessing and/or performing operations on resource 412. The origin volume 402's current authority 408 may be a difference between the full authority and the authority delegated to other cache volumes, as indicated in the delegated authority information 410.

In an example, the origin volume 402 stores the authority information 406 (e.g., delegated authority information 410) in a data structure (e.g., B+ tree, linked list, etc.). The origin volume 402 may insert a record including a cache identifier (ID), the delegated authority, and a resource ID into the data structure, where the cache ID identifies the cache volume to which the origin volume 402 granted the authority for the resource, the authority specifies a set of actions that the cache volume has permission to perform on the resource and a second set of actions that other endpoints are denied from performing on the resource, and the resource ID identifies the resource. The cache ID and the record ID may be keys of the record.

The authority information 406 may be stored in persistent memory. An advantage of storing the authority information 406 in persistent memory may allow the origin volume 402 to serve a large number of caches requesting authorities for millions of resources from the origin volume 402, thus reducing scaling issues. Additionally, the number of caches that the origin volume 402 may interact with and delegate authorities to is not limited to the memory at the origin volume 402.

The origin volume 402 may create, based on the authorities held by the origin volume 402, a set of locks 446 against the resource 412 and perform, based on the locks, operations on the resource 412. A lock 446 may specify a first set of actions that the origin volume 402 has permission to perform on the resource 412 and a second set of actions that other endpoints are denied from performing on the resource 412. The origin volume 402 creates the lock 446 based on the authority 408 held by the origin volume 402, and the lock 446 and the authority 408 specify the same set of allowed dispositions and same set of denied dispositions. The origin volume 402 may hold the set of locks 446 on the resource 412 stored on the origin volume 402. The distributed lock manager 414 may allow certain operations to be performed on the resource 412 subject to the set of locks against the resource. A lock may be created and released based on operations.

One or more locks of the set of locks 446 may be stored in, for example, a local memory of the origin volume 402 and/or in the cloud (e.g., in the cloud system 106 in FIG. 1). The origin volume 402 may continue to hold onto an authority until requested to release it by another entity (e.g., distributed lock manager 434A and/or cache volume 404). Although the origin volume 402 is shown as having one authority and creating and holding two locks on the resource 412, this is not intended to be limiting, and the cache volume 404 may have one or more authorities and/or create and hold one or more locks on one or more resources.

The distributed lock manager 414 may provide a delegation service that coordinates the delegation of authority to multiple requesting caches. For example, the distributed lock manager 414 may delegate authority for a resource (e.g., resource 412) on-demand to a requesting cache. Initially, the origin volume 402 may have all authority to perform actions and deny actions on the resources so that the origin volume 402 can grant/implement one or more locks in order to process operations from client devices (e.g., protocol operations associated with various types of protocols).

The delegated authority information 410 may track authority that the origin volume 402 has delegated to one or more cache volumes 404. The delegated authority information 410 includes the cumulative authority delegated by the origin volume 402 to a set of caches. As the distributed lock manager 414 delegates authority to the volume caches 404, the distributed lock manager 414 may denote/track the delegations of authority to the caches by updating the delegated authority information 410. To prevent race conditions, the distributed lock manager 414 may update the delegated authority information 410 before the caches denote the received authority as current/local authority.

In the example illustrated in FIG. 4, the origin volume 402 may delegate an authority 440, 450 for the resource 412 to the cache volume 404A, 404B and may update the delegated authority information 410 to denote that the authority 440, 450 has been delegated to the cache volume 404A, 404B. The delegation service may combine the resource 412 and the authority delegation message in a single network trip for reception at the cache volume 404A, 404B. The authority 440, 450 may specify a set of actions that the cache volume 404A,404B has permission to perform on the resource 412 and a set of actions that other endpoints (e.g., endpoints other than the cache volume 404A, 404B) are denied from performing on the resource 412.

As discussed above, the origin volume 402 may delegate a first partial authority for the resource 412 to the cache volume 404A and a second partial authority for the resource 412 to the cache volume 404B. Accordingly, multiple endpoints may simultaneously hold a partial authority for a resource. If the first partial authority and the second partial authority do not conflict with each other, then each of the cache volumes 404A and 404B may perform operations on the resource 412. For example, the first partial authority may specify that the cache volume 404A may read or delete the resource 412 stored at the cache volume 404A and that other endpoints may not write to the resource, and the second partial authority may specify that the cache volume 404B may read the resource 412 stored at the cache volume 404B and that other endpoints may not write to the resource. These operations do not conflict with each other.

The distributed lock manager 434 may guard access to the resource 412 stored at the cache volume 404. The cache volume 404 may create, based on the authorities held by the cache volume 404, one or more locks 460, 462 against the resource 412 and then perform operations on the resource 412. A lock 460, 462 may specify a first set of actions that the cache volume 404 has permission to perform on the resource 412 and a second set of actions that other endpoints are denied from performing on the resource 412. The cache volume 404 creates the lock 460, 462 based on the authority 440, 450 held by the cache volume, and the lock 460, 462 and the authority 440, 450 specify the same set of allowed dispositions and same set of denied dispositions. The cache volume 404A, 404B may continue to hold the authority 440, 450, respectively, on the resource 412 stored on the cache volume 404A, 404B.

A plurality of locks on the resource may be created at multiple sites. One or more locks of the set of locks 460, 462 may be stored in, for example, a local memory of the cache volume 404 and/or in the cloud (e.g., in the cloud system 106 in FIG. 1). The locks may be created and released based on requested operations. The cache volume 404 may continue to hold onto an authority until requested to release it by another entity (e.g., distributed lock manager 414 and/or cache volume 404). Although the cache volume 404 is shown as having one authority and creating and holding one lock on the resource 412, this is not intended to be limiting, and the cache volume 404 may have one or more authorities and/or create and hold one or more locks on one or more resources.

Figure 5:
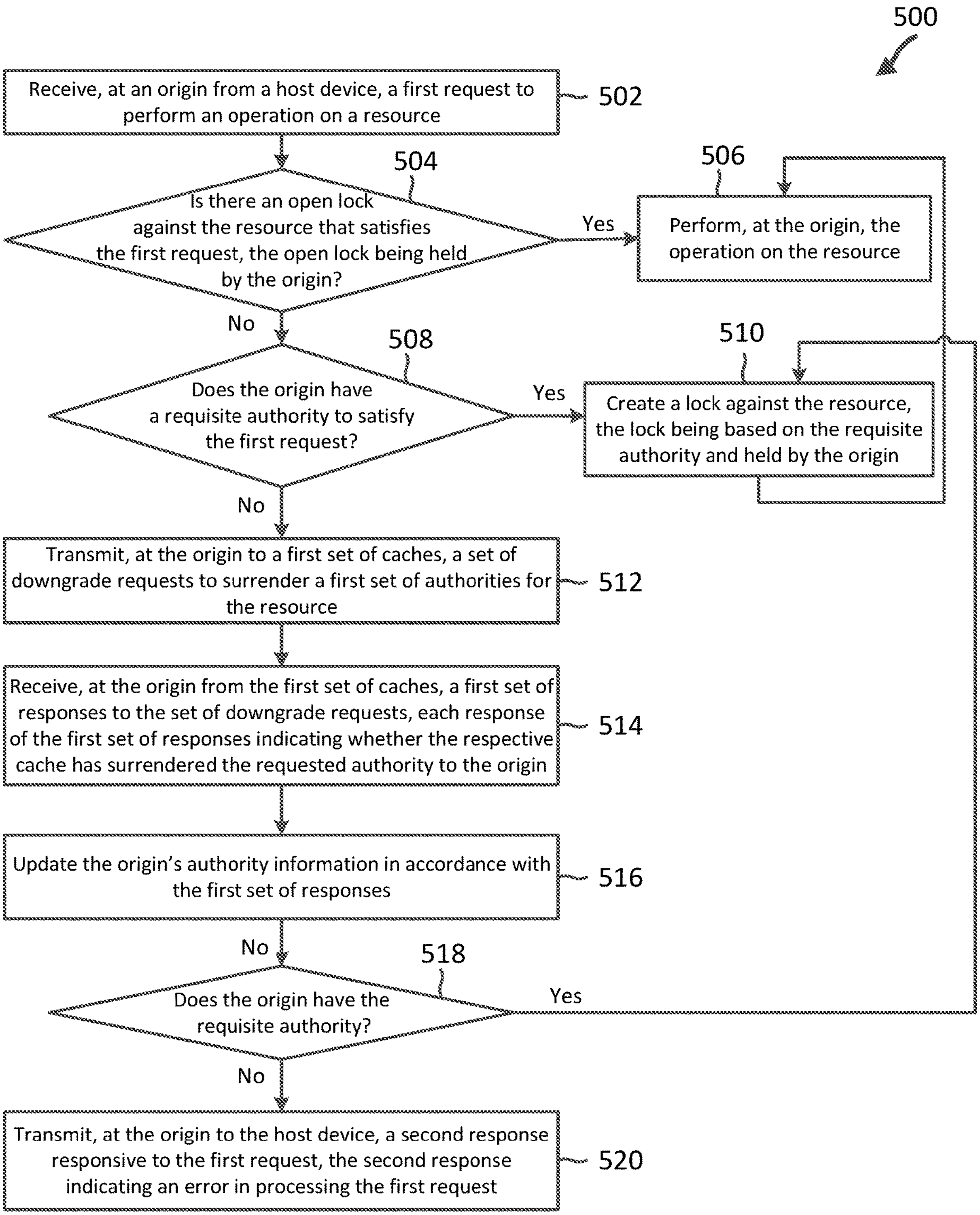
FIG. 5 is a flow diagram of a method for processing a request to perform an operation at an origin volume according to one or more aspects of the present disclosure.

In the example illustrated in FIG. 4, a host device 416 may transmit a request 418 to the origin volume 402 to perform an operation. The host device 416 may correspond to and/or be an example of the host device 208, 210 in FIG. 2 and/or the host device 305 in FIG. 3. In an example, the distributed lock manager 414 intercepts the request and processes the request before forwarding to the origin volume 402. In response to receiving the request 418 from the host device 416, the distributed lock manager 414 and/or the origin volume 402 may perform blocks in a method 500 as shown in FIG. 5. FIG. 4 will be discussed in relation to FIG. 5 to better explain the processing of a request at an origin volume.

FIG. 5 is a flow diagram of the method 500 for processing a request to perform an operation at an origin volume 402 according to one or more aspects of the present disclosure. In an embodiment, the method 500 may be implemented by an exemplary storage platform 102 and/or cloud system 106 in FIG. 1. In particular, the method 500 may be implemented by a cluster, such as a Kubernetes® cluster, of the storage platform 102 (which may be hosted by cloud system 106 or separately by storage platform 102). For example, a data storage system such as the data storage system 202 may utilize one or more components, such as the node 216, the data storage device 228, the distributed lock manager 262, and/or the origin volume 232 to execute the blocks of method 500. As illustrated, the method 500 includes a number of enumerated blocks, but embodiments of the method 500 may include additional blocks before, after, and in between the enumerated blocks. In some embodiments, one or more of the enumerated blocks may be omitted or performed in a different order.

At block 502, the method 500 includes receiving, at an origin from a host device, a first request to perform an operation on a resource stored at the origin. The first request may be, for example, a request to read the resource, a request to write to the resource, or a request to delete the resource.

At block 504, the method 500 includes determining whether there is an open lock against the resource that satisfies the first request, the open lock being held by the origin. In an example, the distributed lock manager (e.g., distributed lock manager 414 in FIG. 4) may have created a lock against the resource in response to a previous request by a host device. A lock specifies a first set of actions that the origin has permission to perform on a resource and a second set of actions that other endpoints (e.g., cache volumes) are denied from performing on the resource. A lock satisfies the first request if the origin has permission to perform the operation on the resource.

If the origin determines that there is an open lock against the resource that satisfies the first request and the open lock is held by the origin, then the method 500 may proceed to block 506. At block 506, the method 500 includes performing, at the origin, the operation on the resource.

If the origin determines that there is not an open lock against the resource that satisfies the first request, where the open lock is held by the origin, then the method 500 may proceed to block 508. At block 508, the method 500 includes determining whether the origin has a requisite authority to satisfy the first request. The origin has the requisite authority to satisfy the first request if the origin holds the authority to perform the requested operation on the resource. In response to a determination that the origin has the requisite authority to satisfy the request, the distributed lock manager (e.g., distributed lock manager 414 in FIG. 4) may, for example, forward the request to the origin for processing. The origin may determine, based on the origin's authority information (e.g., a current authority and/or delegated authority information), whether the origin has the requisite authority to satisfy the request.

If the origin has the requisite authority to satisfy the first request, then the method 500 may proceed to block 510. At block 510, the method 500 includes creating a lock against the resource, the lock being based on the requisite authority and held by the origin. The allowed disposition of the lock and the allowed disposition of the authority may be the same, and the denied disposition of the lock and the denied disposition of the authority may be the same. After the origin creates the lock, the method 500 may proceed to block 506, which includes performing the operation on the resource.

An endpoint may hold multiple locks against a resource so long as the multiple locks are compatible with each other. A first lock conflicts with a second lock if the allowed disposition of the first lock conflicts with (is not compatible with) the denied disposition of the second lock or if the allowed disposition of the second lock conflicts with the denied disposition of the first lock. Referring now to FIG. 4, the origin volume 402 may create the lock 446A against the resource 412 for performing host device 416's requested operation and may create the lock 446B against the resource 412 for performing host device 416's requested operation or another host device's (not shown) requested operation on the resource 412. Accordingly, the origin volume 402 may hold the set of locks 446 including the lock 446A and the lock 446B against the resource 412. The origin volume 402 may continue processing incoming requests.

Referring back to FIG. 5, if the origin does not have the requisite authority to satisfy the first request, then the method 500 may proceed to block 512. At block 512, the method 500 includes transmitting, at the origin to a first set of caches, a set of downgrade requests to surrender a first set of authorities for the resource. The first set of authorities may be a difference between the requisite authority and the current authority of the origin. If the origin holds the first set of authorities for the resource along with its current authority for the resource, then the origin may have the requisite authority to perform the operation on the resource.

To attempt to acquire the requisite authority, the origin may request the first set of authorities from the set of caches. In an example, a first cache may hold a first authority that conflicts with the origin's requisite authority for performing the operation on the resource. The first authority of the first cache may specify a first set of actions that the first cache has permission to perform on the resource and a second set of actions that other endpoints are denied from performing on the resource. The first set of actions may be referred to as an allowed disposition, and the second set of actions may be referred to as a denied disposition. The origin may determine at least a portion of the first authority that conflicts with the origin's requisite authority. The determined portion may be a subset of or may be the first authority. The origin's requisite authority conflicts with a cache's authority if an allowed disposition of the origin's requisite authority conflicts with a denied disposition of the cache's authority or if an allowed disposition of the cache's authority conflicts with a denied disposition of the origin's requisite authority. If the origin's requisite authority conflicts with the cache's authority, then the origin's requisite authority is not compatible with the cache's authority. The origin may perform these actions for each cache of the set of caches.

At block 514, the method 500 includes receiving, at the origin from the first set of caches, a first set of responses to the set of downgrade requests, each response of the first set of responses indicating whether the respective cache has surrendered the requested authority to the origin. A cache may honor a downgrade request and surrender an authority if the cache has no outstanding requests from clients to process based on the authority. A cache may reject a downgrade request and not surrender an authority if the cache has outstanding requests from clients to process based on the authority. The cache may denote/track the surrender of authorities to the origin by updating the cache's authority information before the origin denotes the received authority as surrendered.

At block 516, the method 500 includes updating the origin's authority information in accordance with the first set of responses. In an example, if the origin receives a response indicating that a cache has surrendered a particular authority, then the origin may update the delegated authority information (e.g., delegated authority information 410 in FIG. 4) to reflect that the cache no longer has been delegated the particular authority. The origin may skip block 516 if the first set of responses indicates that the first set of caches has rejected the set of downgrade requests (not surrendered the authorities requested in the set of downgrade requests).

At block 518, the method 500 includes determining whether the origin has the requisite authority. If the first set of responses received at block 514 indicates that the first set of caches honored the set of downgrade requests, then the origin may have the requisite authority to satisfy the first request. More details on authority delegation and authority surrender are provided below in relation to, for example, FIGS. 7 and 8.

If the origin has the requisite authority, the method 500 may proceed to block 510, during which the origin creates a lock against the resource, the lock being based on the requisite authority and held by the origin. After block 510, the method 500 may proceed to block 506, during which the origin performs the operation on the resource. If the origin does not have the requisite authority, then the method 500 may proceed to block 520. At block 520, the method 500 includes transmitting, at the origin to the host device, a second response responsive to the first request, the second response indicating an error in processing the first request.

Referring back to FIG. 4, the cache volume 404A, 404B stores the cached resource 412, and the distributed lock managers 434A and 434B may control access to resources stored at the cache volume 404A and 404B, respectively. The cache volume 404A includes authority information 436A, which may include an authority 440 specifying a set of actions that the cache volume 404A has permission to perform on the resource 412 and a set of actions that other endpoints (e.g., endpoints other than the cache volume 404A) are denied from performing on the resource. The cache volume 404B includes authority information 436B, which may include an authority 450 specifying a set of actions that the cache volume 404B has permission to perform on the resource 412 and a set of actions that other endpoints (e.g., endpoints other than the cache volume 404B) are denied from performing on the resource.

The origin volume 402 includes the delegated authority information 410, which may denote that the origin volume 402 has delegated the authority 440 for the resource 412 to the cache volume 404A and that the origin volume 402 has delegated the authority 450 for the resource 412 to the cache volume 404B. The cache volume 404A, 404B may update the authority information 436A, 436B in accordance with receiving an indication that the origin volume 402 has delegated the authority 440, 450 to the cache volume 404A, 404B.

The authority information 436A, 436B may be stored in persistent memory. In an example, the cache volume 404A, 404B stores the authority information 436A, 436B in a data structure (e.g., B+ tree, linked list, etc.). The cache volume 404A, 404B may insert a record including a delegated authority and a resource ID into the data structure, where the authority specifies a set of actions that the cache volume has permission to perform on the resource and a second set of actions that other endpoints are denied from performing on the resource, and the resource ID identifies the resource. The record ID may be a key of the record.

A plurality of authorities and/or locks that are based on the resource 412 may be stored and/or created at different sites and/or may be stored separately from the resource 410. For example, the plurality of locks may include the set of locks 446 associated with the origin volume 402 and stored at a first location, the lock 460 associated with the cache volume 404A and stored at a second location, and the lock 462 associated with the cache volume 404B and stored at a third location. One or more of the first, second, and/or third locations may be the same as or different from each other. The cache volume 404A may create a lock 460 based on the authority 440 and may then perform the requested operation on the resource 412. The cache volume 404B may create a lock 462 based on the authority 450 and may then perform the requested operation on the resource 412. An endpoint may hold multiple locks against a resource so long as the set of locks are compatible with each other.

An endpoint (e.g., origin volume 402 or cache volume 404) holding a lock may release the lock but hold onto the authority corresponding to the lock. For example, the endpoint may decide to not surrender an authority unless requested to do so by another endpoint. In an example, a cache volume 404A may hold onto the authorities granted by the origin volume 402 to the cache volume 404A. In this example, if the cache volume 404A receives the request again, then the cache volume 404A has the requisite authority to satisfy the request without requesting the authority from the origin volume 402. For example, the cache volume 404A may create a lock based on holding the requisite authority. Accordingly, the cache volume 404A may save a network trip to the origin volume 402 and may satisfy these subsequent requests. A scrubber may be employed to scrub in-memory hash entries (e.g., the least recently used (LRU) entries) if the count of entries exceeds a threshold.

Figure 6:
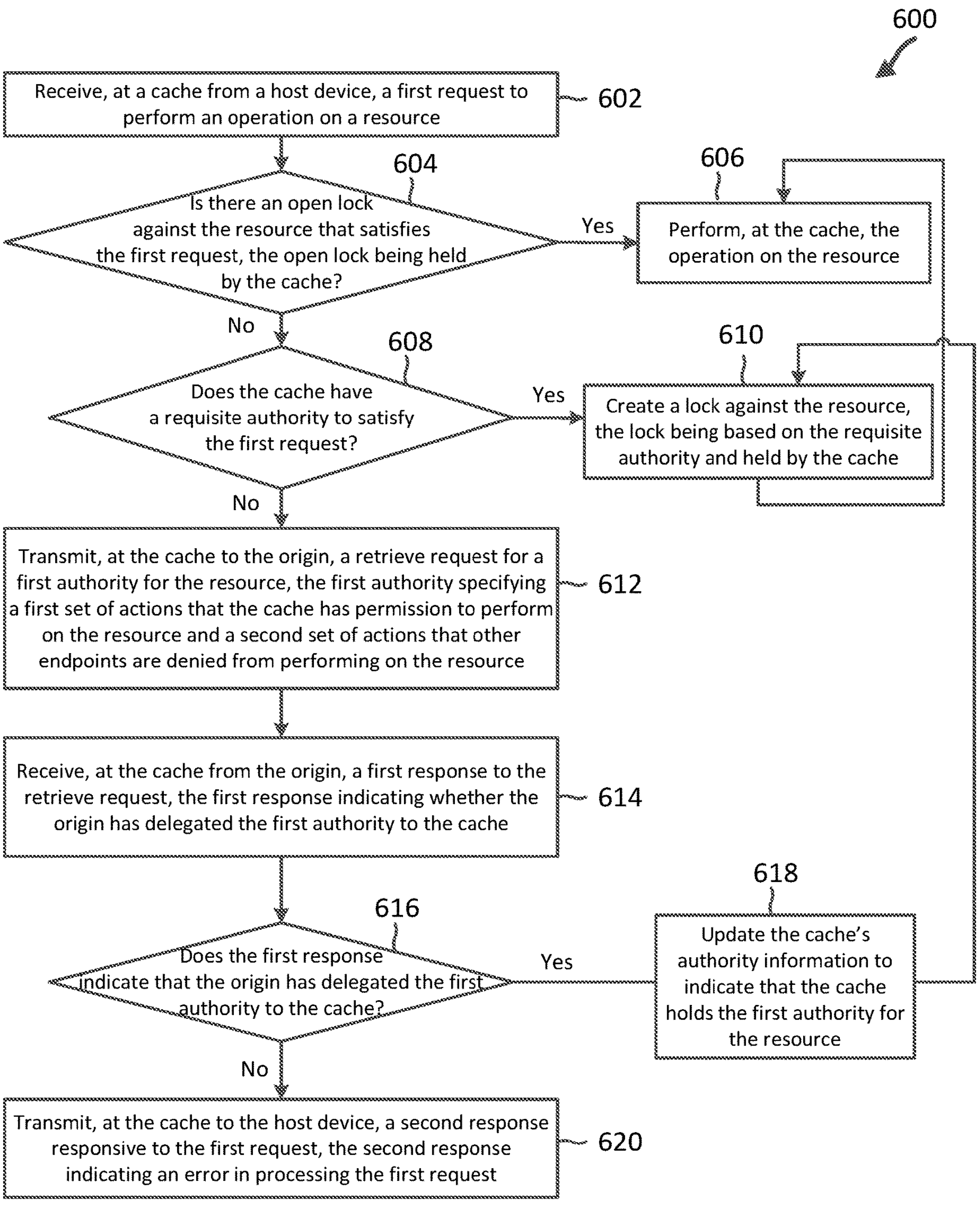
FIG. 6 is a flow diagram of a method for processing a request to perform an operation at a cache volume according to one or more aspects of the present disclosure.

In FIG. 4, a host device 426 may transmit a request 428 to the cache volume 404A to perform an operation on the resource 412 stored at the cache volume 404A. The host device 426 may correspond to and/or be an example of the host device 208, 210 in FIG. 2 and/or the host device 305 in FIG. 3. In an example, the distributed lock manager 434A intercepts the request and processes the request before forwarding to the cache volume 404A. In response to receiving the request 428 from the host device 426, the distributed lock manager 434 and/or the cache volume 404A may perform blocks in a method 600 as shown in FIG. 6. FIG. 4 will be discussed in relation to FIG. 6 to better explain the processing of a request by a cache volume.

FIG. 6 is a flow diagram of the method 600 for processing a request to perform an operation at a cache volume according to one or more aspects of the present disclosure. In an embodiment, the method 600 may be implemented by an exemplary storage platform 102 and/or cloud system 106 in FIG. 1. In particular, the method 600 may be implemented by a cluster, such as a Kubernetes® cluster, of the storage platform 102 (which may be hosted by cloud system 106 or separately by storage platform 102). For example, a data storage system such as the data storage system 204 may utilize one or more components, such as the node 218, the data storage device 230, the distributed lock manager 264, and/or the cache volume 234 to execute the blocks of method 600. As illustrated, the method 600 includes a number of enumerated blocks, but embodiments of the method 600 may include additional blocks before, after, and in between the enumerated blocks. In some embodiments, one or more of the enumerated blocks may be omitted or performed in a different order.

At block 602, the method 600 includes receiving, at a cache from a host device, a first request to perform an operation on a resource stored at the cache. The first request may be, for example, a request to read the resource, a request to write to the resource, or a request to delete the resource.

At block 604, the method 600 includes determining whether there is an open lock against the resource that satisfies the first request, the open lock being held by the cache. In an example, the distributed lock manager (e.g., distributed lock manager 434A in FIG. 4) may have created a lock against the resource in response to a previous request by a host device. A lock specifies a first set of actions that the cache has permission to perform on a resource and a second set of actions that other endpoints (e.g., origin and other caches) are denied from performing on the resource. A lock satisfies the first request if the cache has permission to perform the operation on the resource.

If the cache determines that there is an open lock against the resource that satisfies the first request and the open lock is held by the cache, then the method 600 may proceed to block 606. At block 606, the method 600 includes performing, at the cache, the operation on the resource. In this example, the cache may have already created the lock based on a requisite authority.

If the cache determines that there is not an open lock against the resource that satisfies the first request, where the open lock is held by the cache, then the method 600 may proceed to block 608. At block 608, the method 600 includes determining whether the cache has a requisite authority to satisfy the first request. The cache has the requisite authority to satisfy the first request if the cache holds an authority to perform the requested operation on the resource. An endpoint may perform an action locally, without consulting other endpoints if the endpoint has the requisite authority to perform the action. In response to a determination that the cache has the requisite authority to satisfy the request, the distributed lock manager (e.g., distributed lock manager 434A in FIG. 4) may forward the request to the cache for processing. The cache may determine, based on the cache's authority information, whether the cache has the requisite authority to satisfy the request.

If the cache has the requisite authority to satisfy the first request, then the method 600 may proceed to block 610. At block 610, the method 600 includes creating a lock against the resource, the lock being based on the requisite authority and held by the cache. The allowed disposition of the lock and the allowed disposition of the authority may be the same, and the denied disposition of the lock and the denied disposition of the authority may be the same. After the cache creates the lock, the method 600 may proceed to block 606, which includes performing the operation on the resource.

Referring now to FIG. 4, the cache volume 404A may create the lock 460 against the resource 412 for performing host device 426's requested operation. The cache volume 404A may continue processing incoming requests. The distributed lock manager 434A may allow certain operations to be performed on the resource 412 stored at the cache volume 404A subject to a set of locks (including the lock 460) against the resource.

Referring back to FIG. 6, if the cache does not have the requisite authority to satisfy the first request, then the method 600 may proceed to block 612. At block 612, the method 600 includes transmitting, at the cache to the origin, a retrieve request for a first authority for the resource, the first authority specifying a first set of actions that the cache has permission to perform on the resource and a second set of actions that other endpoints are denied from performing on the resource. The first authority may depend on the operation requested. The first authority may be a difference between the requisite authority and the current authority of the cache.

In an example, the retrieve request may include a mandatory authority portion and an optional authority portion, where the mandatory authority portion indicates a minimum authority required for satisfying the first request (e.g., the first authority) and the optional authority portion indicates an additional authority that the requester desires to have but is not required to have for satisfying the first request. For example, the requestor may use the optional authority portion for prefetching additional authority for subsequent operations, leasing authority (e.g., read, write, connectivity reconnections, etc.), and/or caching reads from the resource and writes to the resource. The origin may grant or deny the mandatory authority portion and none, at least a portion, or all of the additional authority to the requesting cache.

To attempt to acquire the requisite authority, the cache requests the first authority from the origin. The origin may delegate the first authority to the cache if delegated authority information and a set of locks against the resource and held by the origin does not conflict with the first authority requested in the retrieve request. The first authority conflicts with the delegated authority information if the allowed disposition of the first authority conflicts with the denied disposition of the delegated authority information (e.g., delegated authorities) or if the denied disposition of the first authority conflicts with the allowed disposition of the delegated authority information. If the first authority conflicts with the delegated authority information, then the first authority is not compatible with the delegated authority information.

The first authority conflicts with the set of locks that is against the resource and that is held by the origin if the allowed disposition of the first authority conflicts with the denied disposition of the set of locks or if the denied disposition of the first authority conflicts with the allowed disposition of the set of locks. If the first authority conflicts with the set of locks, then the first authority is not compatible with the set of locks.

At block 614, the method 600 includes receiving, at the cache from the origin, a first response to the retrieve request, the first response indicating whether the origin has delegated the first authority to the cache. At block 616, the method 600 includes determining whether the first response indicates that the origin has delegated the first authority to the cache. The origin may deny the retrieve request if the first authority requested in the retrieve request conflicts with the set of locks held by the origin (see block 512 in FIG. 5). Additionally or alternatively, the origin may deny the retrieve request after transmitting a set of downgrade requests to a set of caches to surrender a set of authorities for the resource and was not able to secure one or more of the authorities of the set of authorities.

If the first response indicates that the origin has delegated the first authority to the cache, then the method 600 proceeds to block 618. At block 618, the method 600 includes updating the cache's authority information to indicate that the cache holds the first authority for the resource. The cache may track the delegation of the first authority as a local authority that can be used by the cache to open one or more locks for processing operations under the first authority. After block 618, the method 600 proceeds to block 610, during which the cache creates a lock against the resource, the lock being based on the requisite authority and held by the cache. If the cache holds the first authority, then the cache may continue to create one or more locks based on the first authority, without requesting approval from the origin to do so. Accordingly, as long as the cache has the first authority, it is unnecessary for the cache to request or retrieve the first authority from the origin. The cache may continue to hold the first authority until requested by another endpoint (e.g., the origin) to surrender at least portions or all of the first authority. After block 610, the method 600 proceeds to block 606, during which the cache performs the operation on the resource.

If the first response indicates that the origin has not delegated the first authority to the cache (the origin denied the retrieve request), then the method 600 proceeds to block 620. At block 620, the method 600 includes transmitting, at the cache to the host device, a second response responsive to the first request, the second response indicating an error in processing the first request.

Figure 7:
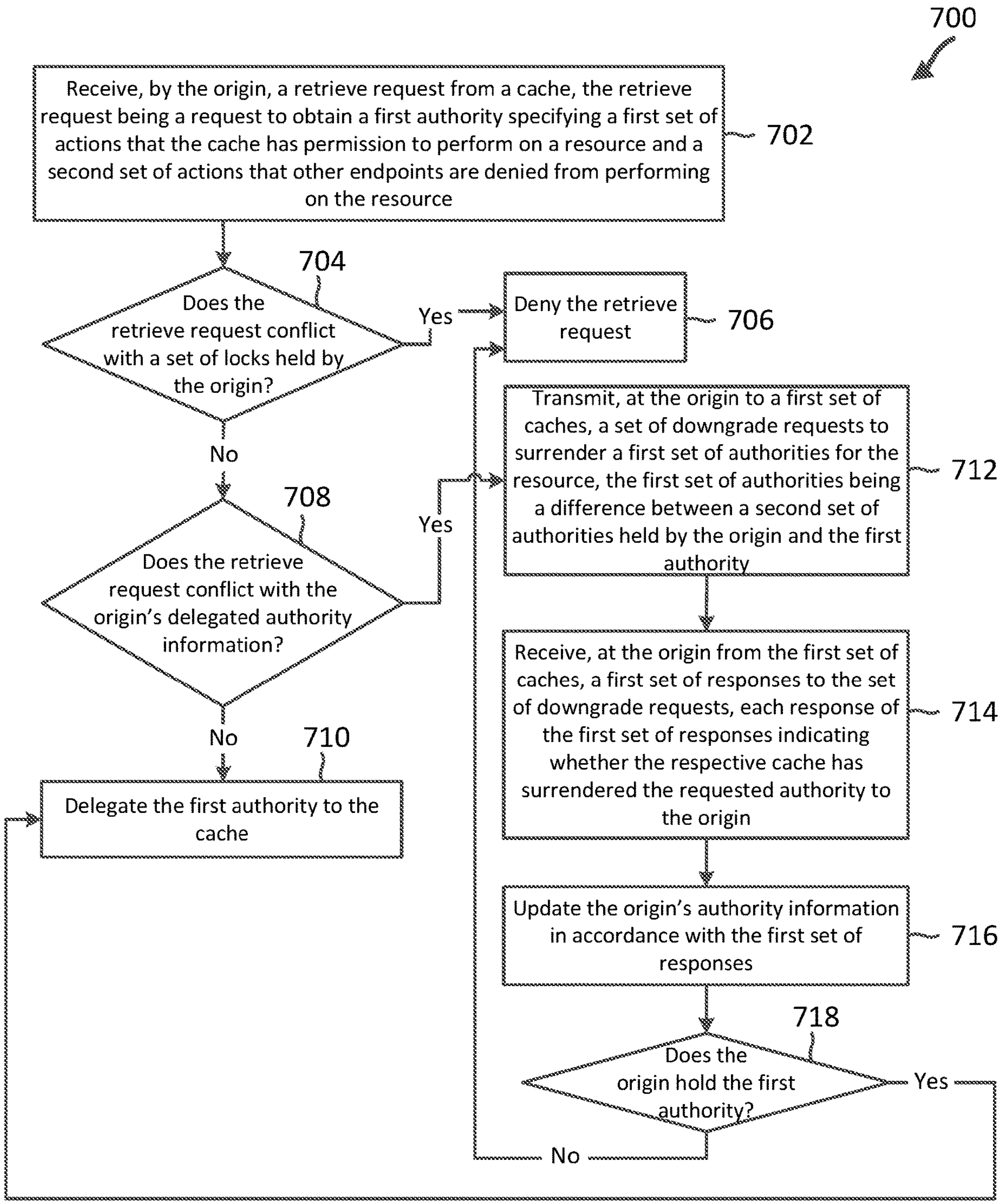
FIG. 7 is a flow diagram of a method for processing a retrieve request according to one or more aspects of the present disclosure.

FIG. 7 is a flow diagram of a method 700 for processing a retrieve request according to one or more aspects of the present disclosure. In an embodiment, the method 700 may be implemented by an exemplary storage platform 102 and/or cloud system 106 in FIG. 1. In particular, the method 700 may be implemented by a cluster, such as a Kubernetes® cluster, of the storage platform 102 (which may be hosted by cloud system 106 or separately by storage platform 102). For example, a data storage system such as the data storage system 202 may utilize one or more components, such as the node 216, the data storage device 228, the distributed lock manager 262, and/or the origin volume 232 (e.g., origin volume 402), to execute the blocks of method 700. As illustrated, the method 700 includes a number of enumerated blocks, but embodiments of the method 700 may include additional blocks before, after, and in between the enumerated blocks. In some embodiments, one or more of the enumerated blocks may be omitted or performed in a different order.

At block 702, the origin hosting a resource receives a retrieve request from a cache, the retrieve request being a request to obtain a first authority specifying a first set of actions that the cache has permission to perform on the resource and a second set of actions that other endpoints are denied from performing on the resource.

At block 704, the origin determines whether the retrieve request conflicts with a set of locks held by the origin. A lock held by an origin may specify an allowed disposition (e.g., a set of actions that the origin has permission to perform on the resource) and a denied disposition (e.g., a set of actions that endpoints other than the origin are denied from performing on the resource). A bitmask may represent the allowed disposition and the denied disposition. In an example, the set of locks on a resource may be captured as a summary, which may be a bitwise OR of the allowed and denied dispositions of the set of locks on the resource. The set of locks on the resource are a subset of the summary. Each action may be represented by a bit in the bitmask summary. By maintaining the summary, the origin may compare the first authority requested in the retrieve request with the summary and determine whether an authority may be granted. A retrieve request that is compatible with the summary is also compatible with all locks on the resource. If the retrieve request is not compatible with the summary, the origin may iterate through all the locks currently on the resource and determine, based on the iterations, a new summary. The origin may then determine if the retrieve request is compatible with the new summary, which represents the set of existing locks on the resource. A first lock is compatible with a second lock if the allowed disposition of the first lock is compatible with the denied disposition of the second lock and the denied disposition of the first lock is compatible with the allowed disposition of the second lock. A third lock is a subset of a fourth lock if the allowed disposition of the third lock is a subset of the allowed disposition of the fourth lock and if the denied disposition of the third lock is a subset of the denied disposition of the fourth lock. If the first lock and the second lock are compatible, then the subset of the first lock is also compatible with the second lock. Systems and methods for providing a lock summary are described in further detail in U.S. Pat. No. 7,822,719, filed Nov. 19, 2007, entitled "Multi-protocol lock manager," which is incorporated herein by reference.

The authority may be stricter than the summary at an endpoint (e.g., origin or cache). For example, when the origin delegates an authority, the origin updates the summary to reflect the delegation. When the origin receives an indication that a cache has surrendered an authority, the origin may wait for an event (e.g., a threshold number of surrenders, a time period, all surrender responses from the applicable caches, etc.) before updating the summary to reflect the one or more surrender of authorities. The discussion of the summary in relation to locks also applies to a summary of authorities. For example, the origin may maintain a bitmask representing a summary of authorities, where each action may be represented by a bit in the bitmask. When a lock is granted at an endpoint, the distributed lock manager associated with the endpoint may ensure that the summary is updated and may also ensure that the summary is within the authority.

If a conflict exists between the retrieve request and the set of locks, then the method 700 may proceed to block 706. At block 706, the origin denies the retrieve request. In an example, the origin may transmit, to the cache, a message indicating an error in processing the retrieve request. In an example, the origin denies the retrieve request by transmitting, to the cache, a message indicating that the origin does not grant the first authority to the cache. The cache may attempt to retrieve the first authority at a later point in time via another retrieve request.

If no conflict exists between the retrieve request and the set of locks, then the method 700 may proceed to block 708. At block 708, the origin determines whether the retrieve request conflicts with the origin's delegated authority information. The retrieve request conflicts with the origin's delegated authority information if they are not compatible with each other. For example, if the allowed disposition of the cache conflicts with (is not compatible with) the denied disposition of the delegated authority information (the authorities delegated to caches by the origin) or if the denied disposition of the cache conflicts with (is not compatible with) the allowed disposition of the delegated authority information, then the retrieve request conflicts with the origin's delegated authority information.

If the origin determines that the retrieve request does not conflict with the origin's delegated authority information, then the method 700 may proceed to block 710. At block 710, the origin delegates the first authority to the cache. In an example, the origin delegates the first authority to the cache by updating the origin's delegated authority information to reflect grant of the first authority to the cache and then transmitting, to the cache, an indication that the origin has delegated the first authority to the cache.

Multiple requests (e.g., retrieve requests, downgrade requests, requests to perform an operation on resource) may be simultaneously processed. For example, a first endpoint may transmit a request to retrieve a set of authorities on a resource and a host device may transmit a request to the origin to perform an operation on the resource may be processed. To ensure that lock compatibility is maintained in the distributed storage system and to avoid race conditions, the cache may receive the indication and update the cache's authority information to reflect the delegation after the origin updates its delegated authority information. In an example, the origin maintains a summary of the delegated authorities and sets a bit in the bitmask representing the allowed disposition and the denied disposition of the delegated authorities (e.g., in response to a retrieve request from a cache). The origin may wait to receive all of the responses to a set of surrender requests before updating the summary of delegated authorities. Accordingly, the origin's view of the authority information may continue to be a superset of the cache's view of its authority information, even in the face of multiple requests from a cache where order of response arrivals at the cache is not guaranteed. The different views may enable concurrent requests from multiple caches to the origin and may increase performance. For example, the origin may update the delegated authority information without waiting for the cache's acknowledgement before handling other retrieve requests from caches or requests to perform operations on the resource at the origin.

Additionally or alternatively, any in-flight retrievals of authority by a cache may be abandoned upon the cache receiving, from an origin, a downgrade request on the same resource. For example, the cache may process the downgrade request and then re-send the retrieve request to the origin. In this example, the origin may ignore the first retrieve request (e.g., the in-flight retrieval) that was sent by the cache to the origin. The origin may abandon a first in-progress retrieve request to process a second retrieve request by the same endpoint or another endpoint, where the second retrieve request has a higher priority than the first retrieve request. Additionally or alternatively, if an in-flight downgrade request is transmitted by an origin, the origin may determine to not delegate conflicting authorities until the origin receives a response for each of the downgrade requests. In an example, the origin may discard a retrieve request from an endpoint to obtain an authority in response to transmission of a downgrade request.

The distributed lock managers ensure that multiple concurrent retrievals, downgrade requests, and lock creations requests at the origin and/or at the cache may be processed in parallel. In an example, an endpoint's processor may execute only one request on a resource at a time. If the endpoint sends a request (e.g., downgrade request or retrieve request) that is in-flight and the endpoint is waiting for a response, other requests may be processed by the cache and/or the origin in the meantime. For example, when the endpoint sends a retrieve request and is waiting on a response to the retrieve request from the origin, non-conflicting lock requests at the cache are under the old authority and may be created without consultation with the origin and without waiting for the response to the retrieve request. Similarly, the cache may transmit multiple retrieve requests to the origin and the origin may receive multiple retrieve requests from caches in parallel.

Similarly, if the origin sends a downgrade request that is in-flight and the origin is waiting for a response, other requests may be processed by the cache and/or the origin in the meantime. For example, when the origin sends a downgrade request and is waiting on a response to the downgrade request from the cache, non-conflicting lock requests at the origin are under the old authority and may be created without waiting for the response to the downgrade request. Similarly, the cache may transmit multiple retrieve requests to the origin and the origin may receive multiple retrieve requests from caches in parallel. In another example, if an endpoint receives a downgrade request for a resource, any in-flight retrieve requests for the same resource may be invalidated and the endpoint may re-send the one or more retrieve requests.

If the origin determines that the retrieve request conflicts with the origin's delegated authority information, then the method 700 may proceed to block 712. At block 712, the origin transmits, to a first set of caches, a set of downgrade requests to surrender a first set of authorities for the resource, the first set of authorities being a difference between a second set of authorities held by the origin and the first authority. The first set of caches may conflict with the retrieve request. To grant the first authority to the cache, the origin attempts to acquire the first set of authorities from the set of caches. The origin may delegate the requested first authority if the retrieve request is compatible with authorities held by all the cache volumes after receiving a response to the set of downgrade requests and also compatible with the set of locks held by the origin.

At block 714, the origin receives, from the first set of caches, a first set of responses to the set of downgrade requests, each response of the first set of responses indicating whether the respective cache has surrendered the requested authority to the origin.

At block 716, the origin updates the origin's authority information in accordance with the first set of responses. In an example, if the origin receives a response indicating that a cache of the set of caches has surrendered a particular authority, then the origin may update the delegated authority information (e.g., delegated authority information 410 in FIG. 4) to reflect that the cache no longer has been delegated the particular authority. The origin may skip block 716 if the first set of responses indicates that the first set of caches has rejected the set of downgrade requests (not surrendered the authorities requested in the set of downgrade requests).

At block 718, the origin determines whether it holds the first authority. The origin may hold the first authority if the first set of responses indicates that the first set of caches surrendered the authorities requested in the set of downgrade requests. The origin may not hold the first authority if at least one of the requested authorities was not surrendered by a cache of the first set of caches. If the origin determines that it holds the first authority, the method 700 may proceed to block 710, during which the origin delegates the first authority to the cache. If the origin determines that it does not hold the first authority, the method 700 may proceed to block 706, during which the origin denies the retrieve request.

Figure 8:
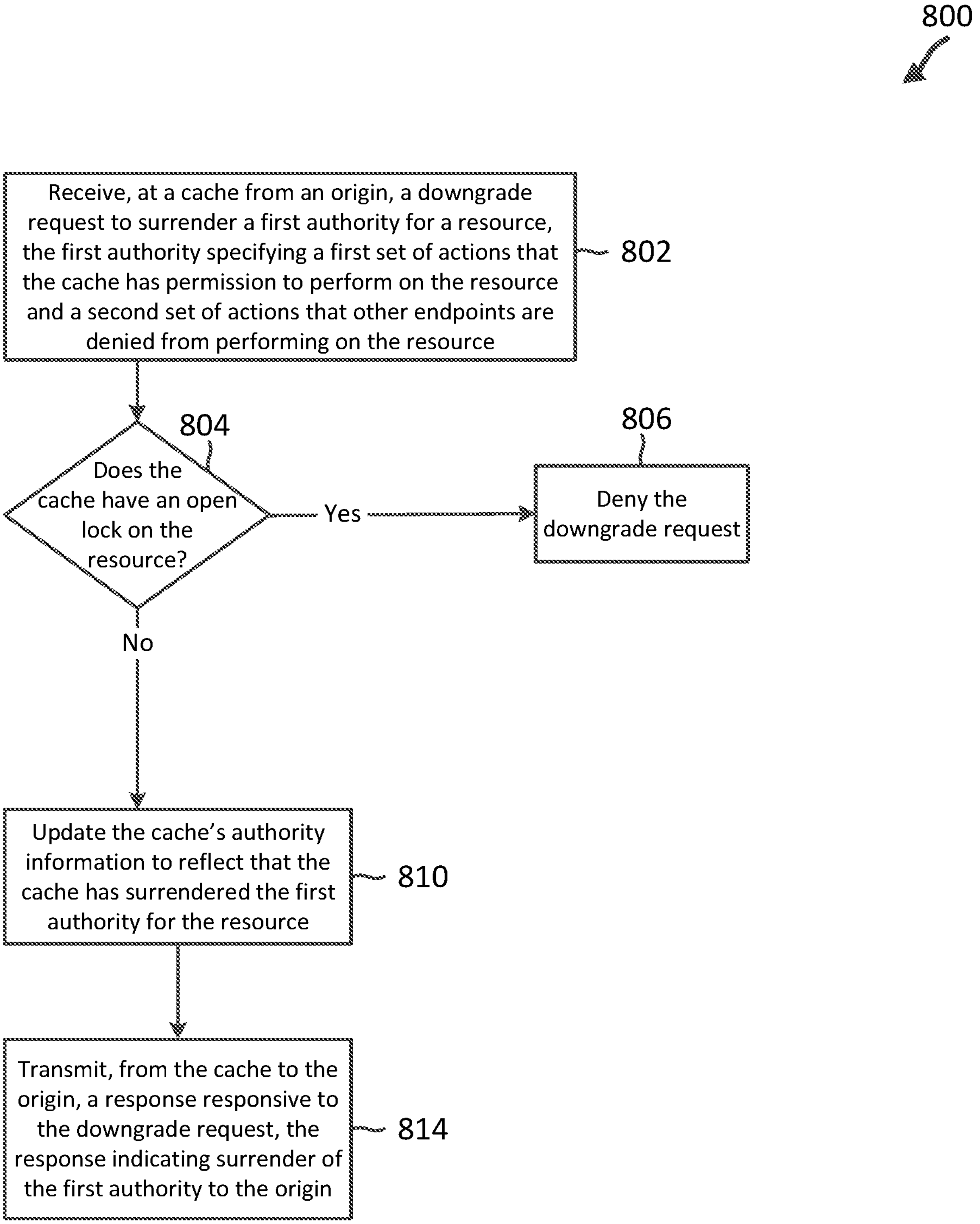
FIG. 8 is a flow diagram of a method for processing a downgrade request according to one or more aspects of the present disclosure.

FIG. 8 is a flow diagram of a method 800 for processing a downgrade request according to one or more aspects of the present disclosure. In an embodiment, the method 800 may be implemented by an exemplary storage platform 102 and/or cloud system 106 in FIG. 1. In particular, the method 800 may be implemented by a cluster, such as a Kubernetes® cluster, of the storage platform 102 (which may be hosted by cloud system 106 or separately by storage platform 102). For example, a data storage system such as the data storage system 204 may utilize one or more components, such as the node 218, the data storage device 230, the distributed lock manager 264, and/or the cache volume 234 to execute the blocks of method 800. As illustrated, the method 800 includes a number of enumerated blocks, but embodiments of the method 800 may include additional blocks before, after, and in between the enumerated blocks. In some embodiments, one or more of the enumerated blocks may be omitted or performed in a different order.

At block 802, the cache receives, from an origin, a downgrade request to surrender a first authority for a resource, the first authority specifying a first set of actions that the cache has permission to perform on the resource and a second set of actions that other endpoints are denied from performing on the resource.

At block 804, the cache determines whether the cache has an open lock on the resource. If the cache determines that the cache has an open lock on the resource, then the method 800 may proceed to block 806. At block 806, the cache denies the downgrade request. In an example, the cache may transmit, to the origin, a message indicating that the cache will not surrender the first authority to the origin. If the cache determines that the cache does not have an open lock on the resource, then the cache may surrender the first authority and the method 800 may proceed to block 810. At block 810, the cache updates the cache's authority information to reflect that the cache has surrendered the first authority for the resource. The cache may hold a second authority and surrender a portion of the second authority to the origin. The surrendered portion may be the first authority.

At block 814, the cache transmits, to the origin, a response responsive to the downgrade request, the response indicating surrender of the first authority to the origin. To ensure that lock compatibility is maintained in the distributed storage system and to avoid race conditions, the origin may receive the indication and update the origin's authority information to reflect the surrender after the cache updates its authority information.

The authority for a resource may have two different views in the distributed lock management system. For example, the origin may have its own view (e.g., an origin-side view), and the cache may have its own view (e.g., cache-side view). When the cache receives the downgrade request, the cache may determine whether to surrender the requested authority. In response to a determination to surrender the authority requested in the downgrade request, the cache may update its authority information to reflect that the cache has surrendered the authority before the cache transmits a message indicating the surrender to the origin. After the cache ratifies its surrender of the authority and updates its authority information, then the origin may update the origin's delegated authority information to reflect this surrender of authority by the cache. Accordingly, the origin-side view on what authorities the cache holds is a superset of the cache-side view of what authorities the cache holds, and the origin will not perform operations that are incompatible with authorities held by the cache.

Although delegation of an authority for an entire resource has been discussed above, this is not intended to be limiting. In an example, the origin volume may delegate an authority for a specific range within the resource. The above non-limiting example describes a single range-slot per resource for all byte range locks on that specific resource. In another example, different range-slots may be used for read-range locks, and different range-slots may be used for write range locks. In another example, multiple range-slots may be used, where the resource regions not contained in any range-slot may be considered as those having no byte range locks. In an example, a range-slot may include a first value including a minimum number that denotes the smallest offset in the file where a range lock starts and a second value including a maximum number that denotes the largest offset in the file where a range lock ends. In response to receiving a byte range lock request, a cache volume may request for authority on the entire file range optionally and mandatorily on only the requested range. Complete range authority on a file may refer to no other range locks on the entire file on any other endpoints and the cache can grant byte range locks without further consulting the origin. In an example, the range authority may specify a set of allowed actions (e.g., a read on a byte-range of a resource) on the resource and a set of denied actions (e.g., read ahead caching or write-behind caching) on the resource. Each action may be represented by a bit in a bitmask summary.

To grant a byte range lock, a cache having no range or a partial range slot (which is not on the full file) consults with the origin, which in turn may consult with other caches whose range slot overlaps the requested range via a downgrade. Along with the range slot passed in as part of the authority, the cache also passes the set of each individual byte range lock (since the client is free to request multiple byte range locks at different ranges from the cache) being requested by the client in the retrieve request which is then forwarded in the downgrade to the conflicting caches. The caches on receiving a downgrade will enumerate their range locks vis-à-vis the requested set and deny the request on finding a conflict, or allow otherwise. On downgrade success, the caches and the origin, persist the updated, possibly shrunken ranges. Before granting the range retrieve request, the origin notes the updated extended range of locks corresponding to the cache initiating the retrieve. On retrieve success, the requesting cache, goes forward with granting the requested byte range lock to the client. The range authority, unless on the full file, is applicable only to the message initiating the retrieve request. Other range requests at the cache even though on the same range, may still trigger a new retrieve request, as the set of locks being requested, could conflict with other locks held at other endpoints.

In some examples, the distributed storage system employs a message suspend-restart model. In an example, the distributed lock managers may ensure that only the message that initiated the range retrieve is able to run to completion using the fetched, partial range authority. A request may be protected from eviction or abandonment if the request establishes that range authority and is an on-going request. A request that has evict or abandonment protection may be allowed to run to completion without initiating a new authority retrieve. Additionally or alternatively, a similar mechanism may be employed at the origin to ensure that the request on restart can run to completion without reinitiating a distributed retrieve or resource-initiating the downgrade request. Upon failure, an exception may be thrown that fails the request and prevents its re-run.

The distributed delegation service framework may also provide for multi-site coordinated actions such as delete-on-last-close. In an example, one or more bits may be dedicated in the authority bit-mask to denote special file conditions such as "marked for deletion" or "delete file". In an example, a delete-on-last-close may involve marking a file for deletion by setting dedicated bits in the authority bit-mask to denote that the file is marked for deletion. With a particular close at a cache, the cache may transmit a request to the origin for a "delete file" mandatory authority. The origin may receive the request and in response, the origin may consult caches via a downgrade message to determine whether there is any conflict with granting the requested authority to delete the file. Subsequently, a file may be marked for deletion at the requesting cache along with other caches and the origin. When a file is "marked for deletion", no further open operation may be allowed, on the file, from any cache or origin. With each last close at a cache, the cache may forward a request to the origin for a "delete file" action. The origin may receive the action request and in response, the origin may consult caches via a downgrade message to determine whether there are any outstanding opens at the caches that conflict with the action to delete the file. Eventually, the file may be deleted on last close.

Figure 9:
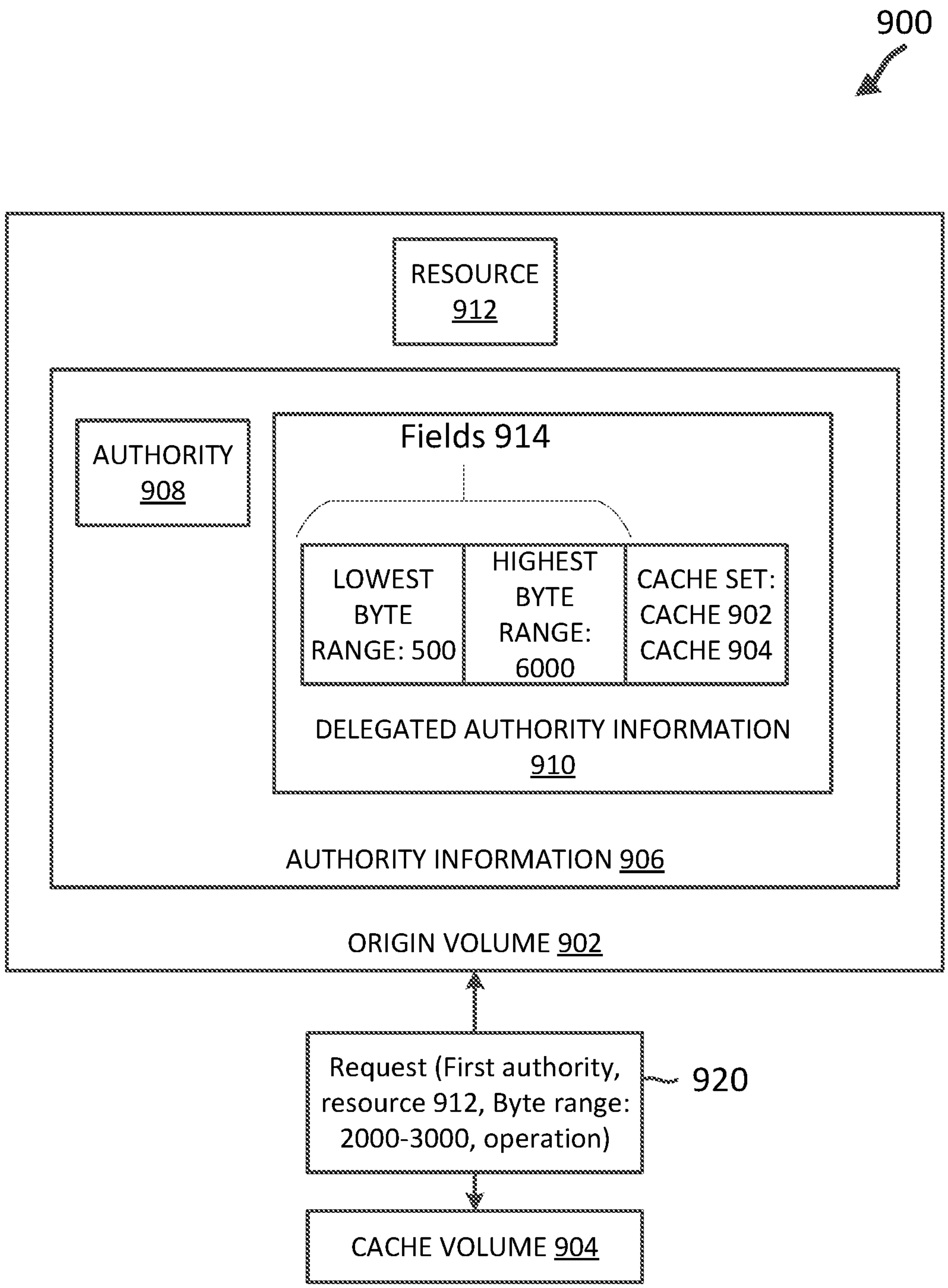
FIG. 9 is a schematic diagram of a byte-range delegation of a resource according to one or more aspects of the present disclosure.

FIG. 9 is a schematic diagram 900 of a byte-range delegation of a resource according to one or more aspects of the present disclosure. As shown in the example illustrated in FIG. 9, an origin volume 902 stores authority information 906 including an authority 908 for the resource 912 and delegated authority information 910.

The delegated authority information 910 may include information indicating the byte range of the resource 912 that the origin volume 902 delegated to one or more cache volumes 904. The origin volume 902 may delegate a first authority for a first byte range of a resource 912 to a cache volume 902 and a second authority for a second byte range of the resource 912 to a cache volume 904. The first byte range may start in the resource 912 at byte 500 and extend to byte 1000, and the second byte range may start in the resource 912 at byte 5000 and extend to byte 6000. The first authority and the second authority may be held by the same client or by different clients. The delegated authority information 910 may be augmented to include fields 914 storing a lowest byte range and a highest byte range on which a byte range authority for the resource 912 is held. For the resource 912, the lowest byte on which a byte range is held is 500, and a highest byte on which a byte range is held is 6000. By maintaining the lowest and highest bytes of the byte range authority delegated for the resource 912, the origin volume 902 may keep track of which caches hold authority for the resource 912.

If a cache volume 904 receives, from a host device, a request to perform an operation on the byte range 2000 to 3000 of the resource 912, the cache volume 904 may transmit a retrieve request 920 for a third authority specifying a set of actions that the cache volume 904 has permission to perform on the byte range 2000 to 3000 of the resource 912 and a set of actions that other endpoints are denied from performing on the byte range 2000 to 3000 of the resource 912. The implementation of byte range authority may involve some degree of enumeration. The set of cache volumes holding an authority (e.g., byte range authority) for the resource 912 includes the cache volume 902 and the cache volume 904. For example, the origin volume 902 may consult with cache volumes 902 and 904 to request each of the cache volumes to enumerate their byte range authority for the resource 912.

The origin volume 902 may perform blocks of the method 700 with supplemental byte range information. The origin volume 902 may delegate the third authority, which is a byte range authority, to the cache volume 904 if the retrieve request 920 does not conflict with the byte range authorities that have been delegated to the set of cache volumes. The cache volume 904 may hold onto the third authority. If the cache volume 904 receives another request to perform a similar operation on the byte range 2000 to 3000 of the resource 912, the cache volume 904 may create, based on the third authority, a lock against the resource (at the byte range) and perform the operation. The origin volume 902 may transmit a downgrade request to one or more caches of the set of caches if the retrieve request 920 conflicts with the byte range authorities that have been delegated to the set of cache volumes. The downgrade request may include the byte range information associated with the downgrade request.

If the origin volume 902 delegates the third authority on a byte range of a resource, the cache volumes may still consult the origin volume 902 each time the cache volume desires to perform an operation on the resource unless the cache volume has full authority for the resource. For example, if the cache volume 904 receives a request to perform a different operation or receives a request to perform an operation on a different byte range of the resource 912, the cache volume 904 may transmit another retrieve request to the origin volume 902 for authority for the different byte range.

Figure 10:
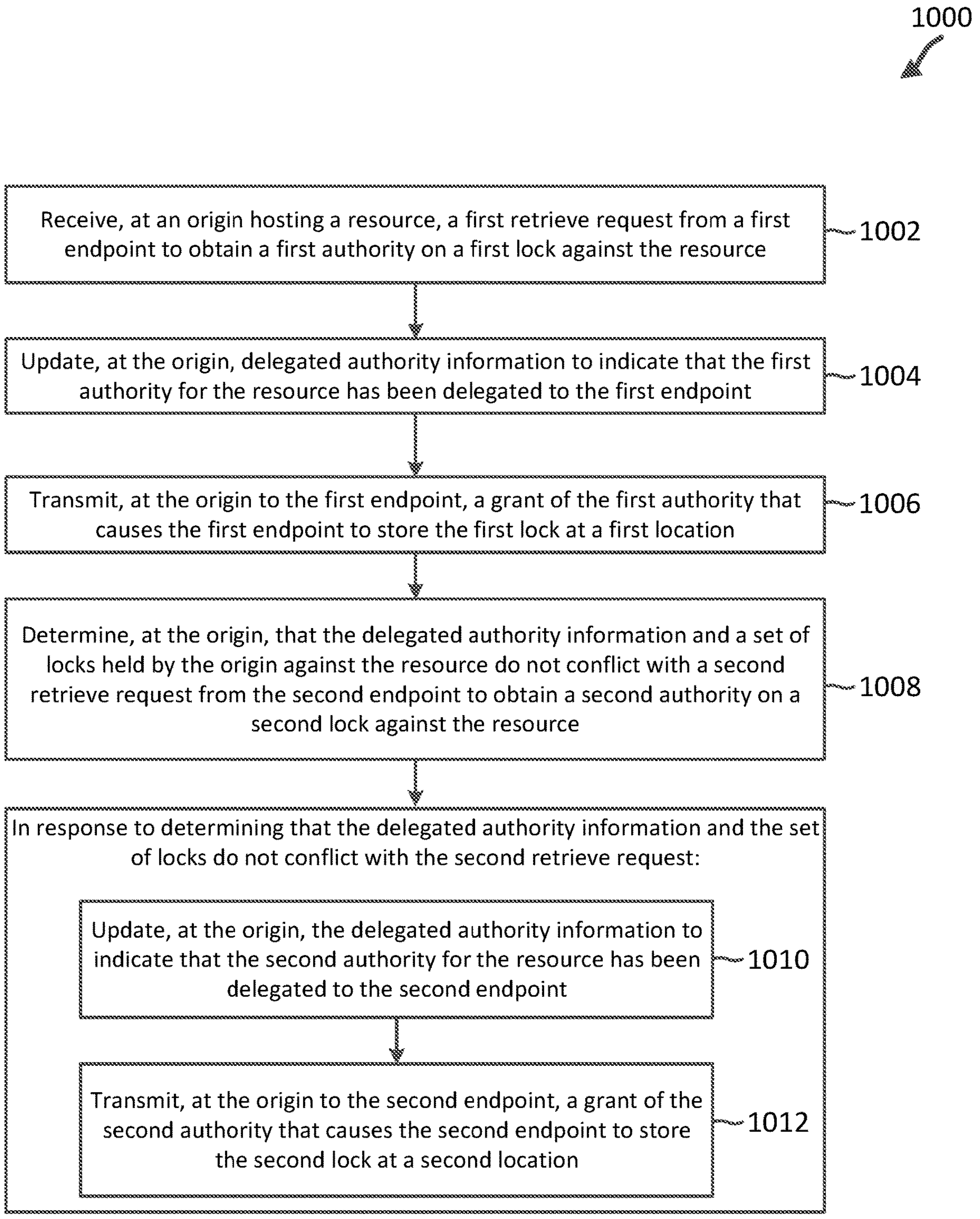
FIG. 10 is a flow diagram of a method for delegating an authority for a resource to multiple endpoints according to one or more aspects of the present disclosure.

FIG. 10 is a flow diagram of a method 1000 for delegating an authority for a resource to multiple endpoints according to one or more aspects of the present disclosure. In an embodiment, the method 1000 may be implemented by an exemplary storage platform 102 and/or cloud system 106 in FIG. 1. In particular, the method 1000 may be implemented by a cluster, such as a Kubernetes® cluster, of the storage platform 102 (which may be hosted by cloud system 106 or separately by storage platform 102). For example, a data storage system such as the data storage system 202 may utilize one or more components, such as the node 216, the data storage device 228, the distributed lock manager 262, and/or the volume 232 (e.g., origin volume 402), to execute the blocks of method 1000. As illustrated, the method 1000 includes a number of enumerated blocks, but embodiments of the method 1000 may include additional blocks before, after, and in between the enumerated blocks. In some embodiments, one or more of the enumerated blocks may be omitted or performed in a different order.

At block 1002, the origin hosting a resource receives a first retrieve request from a first endpoint to obtain a first authority on a first lock against the resource. The first authority may specify a first set of actions that the first endpoint has permission to perform on the resource and a second set of actions that the origin and a second endpoint are denied from performing on the resource.

The origin may delegate the first authority for the resource to the first endpoint by executing blocks 1004 and 1006. At block 1004, the origin may update delegated authority information to indicate that the first authority for the resource has been delegated to the first endpoint. At block 1006, the origin may transmit, to the first endpoint, a grant of the first authority that causes the first endpoint to store the first lock at a first location. The first endpoint may be a cache volume. The location may be a local memory of the cache volume and/or in the cloud (e.g., in cloud system 106). In an example, the cache volume may receive a request to perform an operation, determine that it holds a requisite authority to perform the operation, and create a lock at the first location based on holding the requisite authority, where the requisite authority is the first authority.

At block 1008, the origin determines that delegated authority information and a set of locks held by the origin against the resource do not conflict with a second retrieve request from the second endpoint to obtain a second authority on a second lock against the resource. The second authority may specify a third set of actions that the second endpoint has permission to perform on the resource and a fourth set of actions that the origin and the first endpoint are denied from performing on the resource.

In response to determining that the delegated authority information and the set of locks do not conflict with the second retrieve request, the origin may delegate the second authority for the resource to the second endpoint by executing blocks 1010 and 1012. At block 1010, the origin may update the delegated authority information to indicate that the second authority for the resource has been delegated to the second endpoint. At block 1012, the origin may transmit, to the second endpoint, a grant of the second authority that causes the second endpoint to store the second lock at a second location. The second endpoint may be a cache volume. The second location may be a local memory of the cache volume and/or in the cloud (e.g., in cloud system 106). The second location may be remote from or local to the first location.

Figure 11:
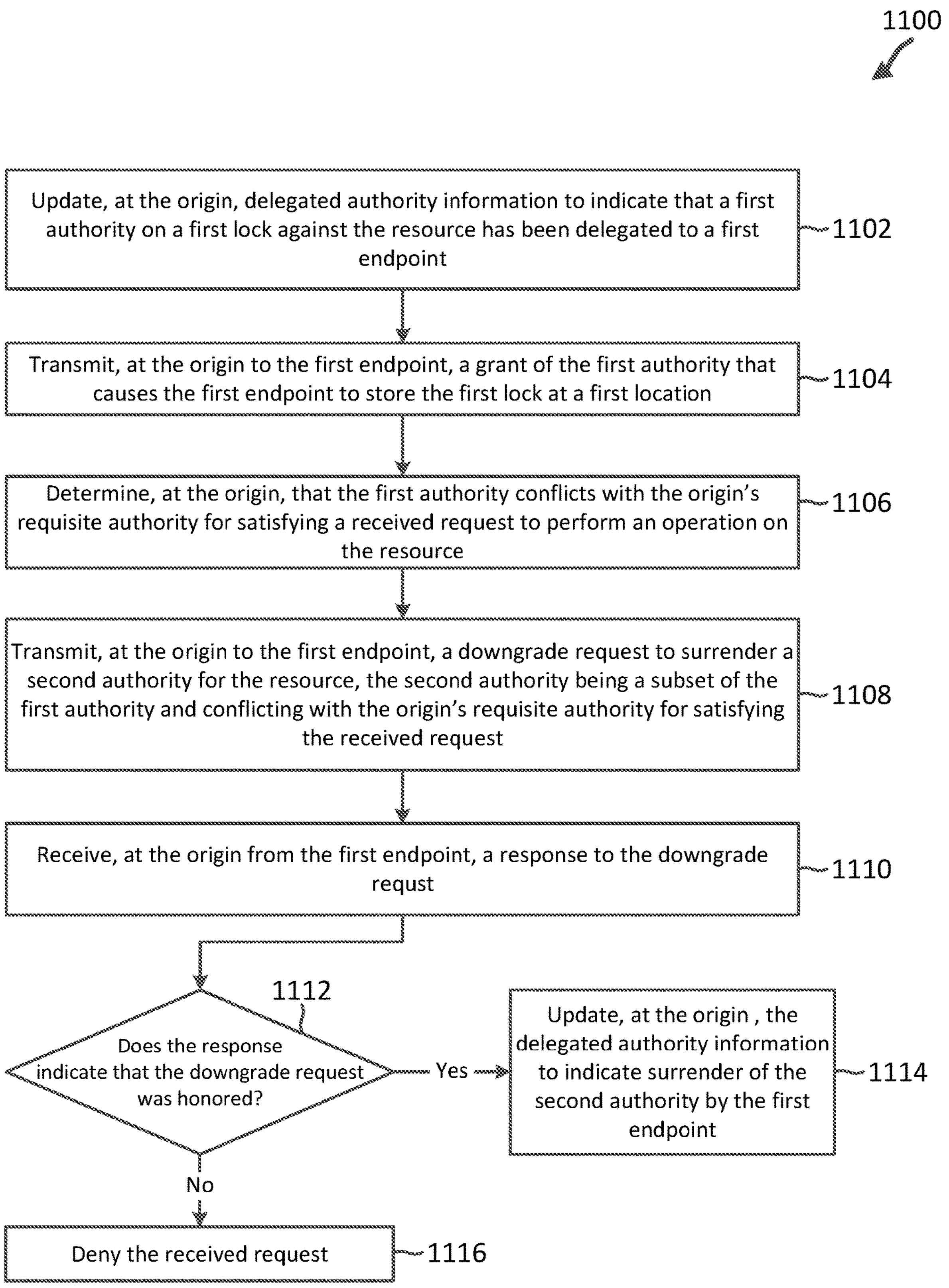
FIG. 11 is a flow diagram of a method for handling a conflict between the origin's requisite authority for satisfying a request and a delegated authority according to one or more aspects of the present disclosure.

FIG. 11 is a flow diagram of a method 1100 for handling a conflict between the origin's requisite authority for satisfying a request and a delegated authority according to one or more aspects of the present disclosure. In an embodiment, the method 1100 may be implemented by an exemplary storage platform 102 and/or cloud system 106 in FIG. 1. In particular, the method 1100 may be implemented by a cluster, such as a Kubernetes® cluster, of the storage platform 102 (which may be hosted by cloud system 106 or separately by storage platform 102). For example, a data storage system such as the data storage system 202 may utilize one or more components, such as the node 216, the data storage device 228, the distributed lock manager 262, and/or the volume 232 (e.g., origin volume 402), to execute the blocks of method 1100. As illustrated, the method 1100 includes a number of enumerated blocks, but embodiments of the method 1100 may include additional blocks before, after, and in between the enumerated blocks. In some embodiments, one or more of the enumerated blocks may be omitted or performed in a different order.

At block 1102, the origin updates delegated authority information to indicate that a first authority on a first lock against the resource has been delegated to a first endpoint. The first authority may specify a first set of actions that the first endpoint has permission to perform on the resource and a second set of actions that other endpoints are denied from performing on the resource.

At block 1104, the origin transmits, to the first endpoint, a grant of the first authority that causes the first endpoint to store the first lock at a first location. At block 1106, the origin determines that the first authority conflicts with the origin's requisite authority for satisfying a received request to perform an operation on the resource. At block 1108, the origin transmits, to the first endpoint, a downgrade request to surrender a second authority for the resource, the second authority being a subset of the first authority and conflicting with the origin's requisite authority for satisfying the received request. At block 1110, the origin receives, from the first endpoint, a response to the downgrade request.

At block 1112, the origin determines whether the response indicates that the downgrade request was honored. If the first endpoint honors the downgrade request, then the first endpoint surrendered the second authority to the origin. Accordingly, the method 1100 proceeds to block 1114, during which the origin updates the delegated authority information to indicate surrender of the second authority by the first endpoint. If the first endpoint does not honor the downgrade request, the first endpoint does not surrender the second authority to the origin. Accordingly, the method 1100 proceeds to block 1116, during which the origin denies the received request.

The origin volume and one or more cache volumes may enter a disconnected mode after losing network connectivity for a particular time duration. While a first cache volume is disconnected from the network, the origin volume and other cache volumes may be unable to consult the first cache volume. The first cache volume may continue to serve data (e.g., stale data) to clients. For example, the first cache volume may continue to create locks based on authorities that were already delegated to it by the origin volume.

A cache volume that is in a connected mode is connected to the network and thus may consult with the origin volume. A cache volume that is in a disconnected mode is not connected to the network and thus is unable to consult with the origin volume. Upon reconnection of the cache volume to the network, the present disclosure provides reconciliation of lock semantic guarantees at the cache volume that were violated while the cache volume was disconnected from the network. In this way, the data and authorities may maintain their consistency.

In an example, configurable modes of behavior for ensuring data consistency after a cache volume and the origin volume reconnect and reconcile are provided. After reconciliation, the cache volume, the origin volume, and other cache volumes may have a consistent view of authority and data. To ensure consistency, the cache volume may be in one of a plurality of configurable modes including a consistent mode, an available mode, and a highly available mode.

If the first cache volume is in the consistent mode and disconnected from the network, any operation that conflicts with the authority held by the first cache volume is denied. For example, while the first cache volume is in the consistent mode and disconnected from the network, the origin volume will not delegate any authorities that would conflict with the authorities previously delegated to the first cache volume by the origin volume. Additionally, the first cache volume may still serve data to clients but will not grant any locks beyond the authority already fetched from the origin volume while the first cache volume was previously connected to the network. In disconnected mode, the first cache volume may still provide an acceptable level of availability to host devices. Upon re-entering connected mode, reconciliation between the origin volume and the first cache volume is unnecessary.

If the first cache volume is in the available mode and disconnected from the network, the origin volume may delegate any authorities that would conflict with the authorities previously delegated to the first cache volume to other cache volumes. The origin volume may update the origin volume's view of the delegated authority information based on the delegations (e.g., in the origin lock metafile). Upon re-entering connected mode, reconciliation between the origin volume and the first cache volume is performed. During reconciliation, the first cache volume will fetch the origin volume's view of the delegated authority information, compare the origin volume's view of the delegated authority information with the first cache volume's view of the authority information, and remove authorities and/or release locks that are incompatible with the origin volume's view of the delegated authority information. In writeback caches, the origin volume may also reconcile contents of resources (e.g., files) upon detecting write conflicts in the origin and cache views of the authority. After reconciliation, the origin volume and the first cache volume are consistent.

In another example, the first cache volume is in a highly available mode. While the first cache volume is in the highly available mode, the first cache volume may create locks that extend the authority delegated to it by the origin volume. Upon re-entering connected mode, reconciliation between the origin volume and the first cache volume is performed. During reconciliation, the first cache volume communicates the first cache volume's updated authority information in a special retrieve request that may be granted or denied by the origin volume. The first cache volume may then reconcile its locks and contents based on the fetched file attributes and the response to the special retrieve request.

In an embodiment, a method includes receiving, at an origin hosting a resource, a first retrieve request from a first endpoint to obtain a first authority on a first lock against the resource, the first authority specifying a first set of actions that the first endpoint has permission to perform on the resource and a second set of actions that the origin and a second endpoint are denied from performing on the resource. The method also includes delegating, at the origin, the first authority for the resource to the first endpoint. The method further includes determining, at the origin, that delegated authority information and a set of locks held by the origin do not conflict with a second retrieve request from a second endpoint to obtain a second authority on a second lock against the resource, the second authority specifying a third set of actions that the second endpoint has permission to perform on the resource and a fourth set of actions that the origin and the first endpoint are denied from performing on the resource. The method also includes delegating, at the origin, the second authority for the resource to the second endpoint in response to determining that the delegated authority information and the set of locks held by the origin do not conflict with the second retrieve request.

In an example, the first and second locks for the resource are distributed across the first and second endpoints. In an example, the method may also include accessing, at the origin, the resource in accordance with a third lock specifying a fifth set of actions that the origin has permission to perform on the resource and a sixth set of actions that other endpoints including the first and second endpoints are denied from performing on the resource. In an example, the method may further include determining, at the origin, that the delegated authority information does not conflict with the second retrieve request in response to determining that a set of allowed dispositions in the delegated authority information does not conflict with the denied disposition of the second authority and in response to determining that a set of denied dispositions in the delegated authority information does not conflict with the allowed disposition of the second authority.

In an example, the method may also include determining, at the origin, that the set of locks against the resource does not conflict with the second retrieve request in response to determining that an allowed disposition of the set of locks is compatible with the fourth set of actions and in response to determining that a denied disposition of the set of locks is compatible with the third set of actions. In an example, the method may further include transmitting, at the origin to the second endpoint, a downgrade request to surrender a portion of the second authority for the resource. In an example, the origin's view of the first endpoint's authority for the resource is a superset of the first endpoint's view of the first endpoint's authority for the resource. In an example, the method may also include denying, at the origin, a third retrieve request from a third endpoint to obtain a third authority for the resource in response to determining that the third authority conflicts with the set of locks held by the origin.

In an example, the method may further include denying, at the origin, a third retrieve request from a third endpoint to obtain a third authority for the resource in response to determining that the third authority conflicts with the first authority and in response to determining that the first endpoint is in a disconnected mode. In an example, the method may also include granting, at the origin, a third retrieve request from a third endpoint to obtain a third authority that conflicts with the first authority in response to determining that the first endpoint is in a disconnected mode. In an example, the first retrieve request specifies a byte range including a minimum value and a maximum value of the resource.

In an embodiment, a non-transitory machine-readable medium having stored thereon instructions for processing a retrieve request at an origin hosting a resource that is cached at a first endpoint in a distributed storage system, includes machine executable code which when executed by at least one machine, causes the machine to receive, by the origin, a retrieve request from the first endpoint, the retrieve request being a request to obtain a first authority specifying a first set of actions that the first endpoint has permission to perform on the resource and a second set of actions that other endpoints are denied from performing on the resource. The machine executable code which when executed by at least one machine, may also cause the machine to determine, at the origin, that the retrieve request conflicts with the origin's delegated authority information. The machine executable code which when executed by at least one machine, may further cause the machine to transmit, at the origin to a first set of caches, a set of downgrade requests to surrender a first set of authorities for the resource, the first set of authorities being a difference between a second set of authorities held by the origin and the first authority. The machine executable code which when executed by at least one machine, may also cause the machine to receive, at the origin from the first set of caches, a first set of responses to the set of downgrade requests, each response of the first set of responses indicating whether the respective cache has surrendered the requested authority to the origin. The machine executable code which when executed by at least one machine, may further cause the machine to update the origin's delegated authority information in accordance with the first set of responses.

In an example, the non-transitory machine-readable medium may also include code, which causes the machine to delegate, at the origin, the first authority to the first endpoint in response to determining that the retrieve request is compatible with the origin's updated delegated authority information. In an example, the non-transitory machine-readable medium may further include code, which causes the machine to deny, at the origin, the retrieve request in response to determining that the retrieve request conflicts with the origin's updated delegated authority information. In an example, the resource is cached at the first endpoint. In an example, the non-transitory machine-readable medium may also include code, which causes the machine to create, at the origin, a first lock on the resource in response to receiving a request from a host device to perform an operation on the resource.

In an embodiment, a computing device comprising includes a memory containing a machine-readable medium comprising machine executable code having stored thereon instructions for processing a retrieve request received at an origin hosting a resource in a distributed storage system and also includes a processor coupled to the memory. The processor may be configured to execute the machine executable code to receive, at an origin hosting a resource, a first retrieve request from a first endpoint to obtain a first authority on a first lock against the resource, the first authority specifying a first allowed disposition of the first endpoint and a first denied disposition of other endpoints; update, at the origin, delegated authority information to reflect delegation of the first authority for the resource to the first endpoint; transmit, at the origin to the first endpoint, a message indicating delegation of the first authority for the resource to the first endpoint; determine, at the origin, that delegated authority information and a set of locks held by the origin are compatible with a second retrieve request from a second endpoint to obtain a second authority on a second lock against the resource, the second authority specifying a second allowed disposition of the second endpoint and a second denied disposition of other endpoints; and delegate, at the origin, the second authority for the resource to the second endpoint in response to determining that the delegated authority information and the set of locks held by the origin are compatible with the second retrieve request.

In an example, the first retrieve request specifies a byte range authority of the resource. In an example, the processor is configured to execute the machine executable code to create, at the origin, a first lock based on a third authority that is compatible with the first and second authorities in response to receiving a request from a host device to perform an operation on the resource. In an example, the processor is configured to execute the machine executable code to discard, at the origin, a third retrieve request from a third endpoint of the first set of caches to obtain a third authority in response to transmission of a downgrade request of the set of downgrade requests.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter may be implemented as a method, apparatus, or article of manufacture using standard application or engineering techniques to produce software, firmware, hardware, or any combination thereof to control a computer to implement the disclosed subject matter. The term "article of manufacture" as used herein may encompass a computer application accessible from any computer-readable device, carrier, or media. Of course, many modifications may be made to this configuration without departing from the scope or spirit of the claimed subject matter.

As used in this application, the terms "component", "module", "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:

receiving, at an origin hosting a resource in a distributed storage system, a first retrieve request from a first endpoint to obtain the first authority for the resource;

determining, at the origin, that the first retrieve request is compatible with delegated authority information maintained by the origin and with a set of locks held by the origin for the resource;

sending, from the origin to the first endpoint, a first delegation including identification of the first authority for the resource, wherein the first authority explicitly specifies a first set of actions that the first endpoint is permitted to perform on the resource and a second set of actions that other endpoints are denied from performing on the resource, the first set of actions including permission for the first endpoint to create one or more locks against the resource;

causing, by the origin, the first endpoint to create a first lock against the resource based on the first authority;

causing, by the origin, the first endpoint to perform, locally by the first endpoint instead of at the origin, based on the first lock against the resource, at least one first action from the first set of actions on the resource;

receiving, at the origin, a second retrieve request from a second endpoint to obtain a second authority for the resource;

determining, at the origin, that the second retrieve request is compatible with the delegated authority information maintained by the origin and with the set of locks held by the origin for the resource;

sending, from the origin to the second endpoint, a second delegation including identification of the second authority for the resource, wherein the second authority explicitly specifies a third set or actions that the second endpoint is permitted to perform on the resource and a fourth set of actions that the origin and the first endpoint are denied from performing on the resource;

causing, by the origin, the second endpoint to create a second lock against the resource based on the second authority; and causing, by the origin, the second endpoint to perform, locally at the second endpoint instead of at the origin, based on the second lock, at least one second action from the third set of actions.

2. The method of claim 1, wherein the first and second locks for the resource are distributed across the first and second endpoints.

3. The method of claim 1, further comprising:

accessing, at the origin, the resource in accordance with a third lock specifying a set of actions that the origin has permission to perform on the resource and a set of actions that other endpoints including the first and second endpoints are denied from performing on the resource.

4. The method of claim 1, wherein the determining that the delegated authority information is compatible with the second retrieve request is in response to determining that a set of allowed dispositions in the delegated authority information is compatible with the fourth set of actions and in response to determining that a set of denied dispositions in the delegated authority information is compatible with the third set of actions.

5. The method of claim 1, wherein the determining that the set of locks is compatible with the second retrieve request is in response to determining that an allowed disposition of the set of locks is compatible with the fourth set of actions and in response to determining that a denied disposition of the set of locks is compatible with the third set of actions.

6. The method of claim 1, further comprising: transmitting, from the origin to the second endpoint, a downgrade request to surrender a portion of the second authority for the resource.

7. The method of claim 1, wherein the origin's view of the first endpoint's authority for the resource is a superset of the first endpoint's view of the first endpoint's authority for the resource.

8. The method of claim 1, further comprising:

receiving, at the origin, a third retrieve request from a third endpoint to obtain a third authority for the resource; and denying the third retrieve request in response to determining that the third authority conflicts with the set of locks held by the origin.

9. The method of claim 1, further comprising:

receiving, at the origin, a third retrieve request from a third endpoint to obtain a third authority for the resource; and denying the third retrieve request in response to determining that the third authority conflicts with the first authority and in response to determining that the first endpoint is in a disconnected mode.

10. The method of claim 1, further comprising:

receiving, at the origin, a third retrieve request from a third endpoint to obtain a third authority that conflicts with the first authority; and granting the third retrieve request in response to determining that the first endpoint is in a disconnected mode.

11. The method of claim 1, wherein the first retrieve request specifies a byte range including a minimum value and a maximum value of the resource.

12. A non-transitory machine-readable medium having stored thereon instructions for processing a retrieve request at an origin hosting a resource that is cached at a first endpoint in a distributed storage system, comprising machine executable code which when executed by at least one processor of an origin, causes the origin to:

receive a retrieve request from the first endpoint to obtain a first authority for the resource;

determine that the retrieve request is compatible with delegated authority information maintained by the origin and with a set of locks held by the origin for the resource;

transmit, to the first endpoint, a first delegation including identification of a first authority for the resource, wherein the first authority explicitly specifies a first set of actions that the first endpoint is permitted to perform on the resource and a second set of actions that other endpoints are denied from performing on the resource;

cause the first endpoint to create a first lock against the resource based on the first authority;

cause the first endpoint to perform, locally at the first endpoint and not at the origin, based on the first lock against the resource, at least one first action from the first set of actions on the resource;

receive a second retrieve request from a second endpoint to obtain a second authority for the resource;

determine that the second retrieve request is compatible with the delegated authority information maintained by the origin and with the set of locks held by the origin for the resource;

send, to the second endpoint, a second delegation including identification of the second authority for the resource, wherein the second authority explicitly specifies a third set of actions that the second endpoint is permitted to perform on the resource and a fourth set of actions that the origin and the first endpoint are denied from performing on the resource; and cause at the second endpoint to perform, locally at the second endpoint instead of at the origin, based on the second lock against the resource at least one second action from the third set of actions on the resource.

13. The non-transitory machine-readable medium of claim 12, further comprising code, which when executed causes the machine to: send, from the origin, the delegation of the first authority including identification of the first authority to the first endpoint in response to determining that the retrieve request is compatible with the origin's updated delegated authority information, the identification including information about the first set of actions and the second set of actions.

14. The non-transitory machine-readable medium of claim 12, further comprising code, which when executed causes the machine to:

deny, at the origin, the retrieve request in response to determining that the retrieve request conflicts with the origin's updated delegated authority information.

15. The non-transitory machine-readable medium of claim 12, wherein the resource is cached at the first endpoint.

16. The non-transitory machine-readable medium of claim 12, further comprising code, which when executed causes the machine to:

create, at the origin, a second lock on the resource in response to receiving a request from a host device to perform an operation on the resource.

17. A computing device comprising:

a memory containing a machine-readable medium comprising machine executable code having stored thereon instructions for processing a retrieve request received at an origin hosting a resource in a distributed storage system; and a processor coupled to the memory, the processor configured to execute the machine executable code to:

receive, at an origin hosting a resource in a distributed storage system, a first retrieve request from a first endpoint to obtain the first authority for the resource;

determine, at the origin, that the first retrieve request is compatible with delegated authority information maintained by the origin and with a set of locks held by the origin for the resource;

send, from the origin to the first endpoint, a first delegation including identification of the first authority for the resource, wherein the first authority explicitly specifies a first set of actions that the first endpoint is permitted to perform on the resource and a second set of actions that other endpoints are denied from performing on the resource, the first set of actions including permission for the first endpoint to create one or more locks against the resource;

cause, by the origin, the first endpoint to create a first lock against the resource based on the first authority;

cause, by the origin, the first endpoint to perform, locally by the first endpoint instead of at the origin, based on the first lock against the resource, at least one first action from the first set of actions on the resource;

receive, at the origin, a second retrieve request from a second endpoint to obtain a second authority for the resource;

determine, at the origin, that the second retrieve request is compatible with the delegated authority information maintained by the origin and with the set of locks held by the origin for the resource;

send, from the origin to the second endpoint, a second delegation including identification of the second authority for the resource, wherein the second authority explicitly specifies a third set or actions that the second endpoint is permitted to perform on the resource and a fourth set of actions that the origin and the first endpoint are denied from performing on the resource;

cause, by the origin, the second endpoint to create a second lock against the resource based on the second authority; and cause, by the origin, the second endpoint to perform, locally at the second endpoint instead of at the origin, based on the second lock, at least one second action from the third set of actions.

18. The computing device of claim 17, wherein the first retrieve request specifies a byte range authority of the resource.

19. The computing device of claim 17, wherein the processor is further configured to execute the machine executable code to:

create, at the origin, a third lock based on a third authority that is compatible with the first and second authorities in response to receiving a request from a host device to perform an operation on the resource.

20. The computing device of claim 17, wherein the processor is further configured to execute the machine executable code to:

discard, at the origin, a third retrieve request from a third endpoint to obtain a third authority in response to transmission of a downgrade request.

* * * * *